(12) United States Patent
Kikuzuki

(10) Patent No.: US 10,560,142 B2
(45) Date of Patent: Feb. 11, 2020

(54) SPECTRAL ANALYSIS APPARATUS AND SPECTRAL ANALYSIS METHOD

(71) Applicant: FUJITSU LIMITED, Kawasaki-shi, Kanagawa (JP)

(72) Inventor: Tatsuya Kikuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/357,042

(22) Filed: Mar. 18, 2019

(65) Prior Publication Data
US 2019/0326947 A1    Oct. 24, 2019

(30) Foreign Application Priority Data
Apr. 23, 2018    (JP) .................................. 2018-082637

(51) Int. Cl.
*H04B 1/707*    (2011.01)
*G06F 17/14*    (2006.01)
*H04B 1/69*    (2011.01)

(52) U.S. Cl.
CPC ........... *H04B 1/707* (2013.01); *G06F 17/142* (2013.01); *H04B 2001/6912* (2013.01)

(58) Field of Classification Search
CPC .. H04B 1/707; H04B 1/69; H04B 2001/6912; H04B 3/542; H04B 2203/5416; G06F 17/142; H04L 27/10
See application file for complete search history.

(56) References Cited

U.S. PATENT DOCUMENTS

| 2011/0037643 A1* | 2/2011 | Torin ..................... G01S 7/285 |
| | | 342/173 |
| 2014/0269843 A1* | 9/2014 | Schaffner ................. H04B 1/69 |
| | | 375/139 |
| 2017/0138847 A1* | 5/2017 | Pate .......................... G01J 3/10 |

FOREIGN PATENT DOCUMENTS

| JP | 11-285495 A | 10/1999 |
| JP | 2005-523616 A | 8/2005 |
| WO | WO 03/090037 A2 | 10/2003 |

OTHER PUBLICATIONS

Semtech LoRa SX1301, "Wireless & Sensing Products Datasheet", www.semtech.com, pp. 1-40, V2.3, May 2017.

* cited by examiner

*Primary Examiner* — Ted M Wang
(74) *Attorney, Agent, or Firm* — Arent Fox LLP

(57) ABSTRACT

A non-transitory computer-readable recording medium storing a program that causes a computer to execute a procedure to determine a feature of each standard of a wireless environment in which radio signals including a CSS signal chirp-modulated co-exist, the procedure includes obtaining a spectrum by subjecting each radio signal to fast Fourier transform with predetermined frequency resolution and time resolution capable of visualizing a feature of the CSS signal, coarsening the frequency resolution of the spectrum by adopting an effective value in a specific frequency domain, calculating a duration of the radio signal, based on the coarsened frequency resolution of the spectrum, coarsening the time resolution of the spectrum by adopting an effective value in the duration, calculating a bandwidth of the radio signal, based on the coarsened time resolution of the spectrum, and determining the feature of the radio signal of each standard, based on the duration and the bandwidth.

10 Claims, 21 Drawing Sheets

FIG. 4
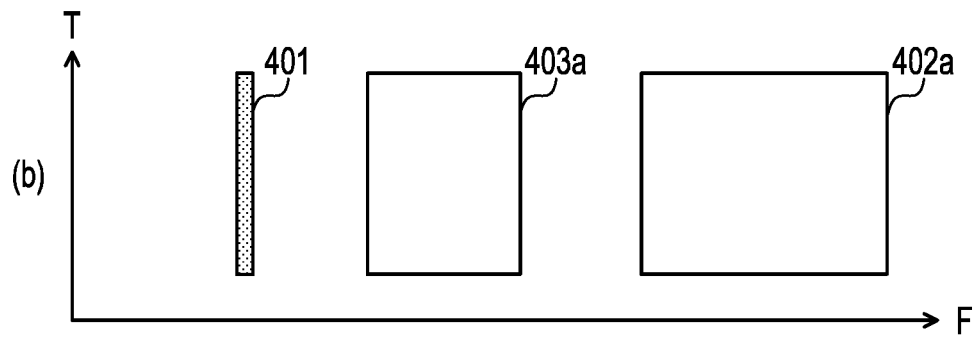
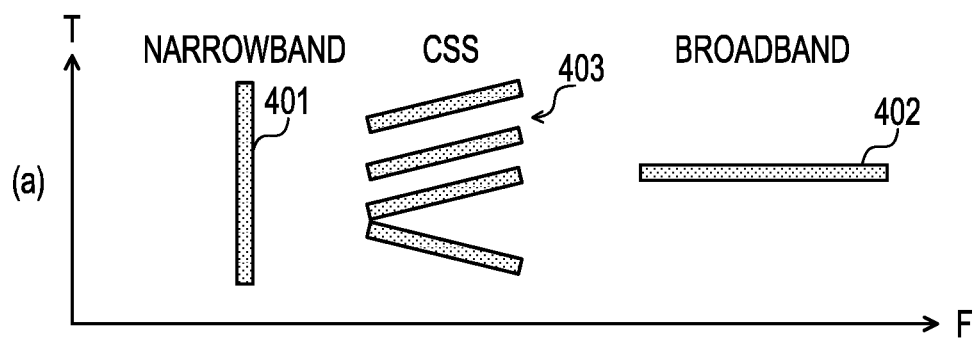
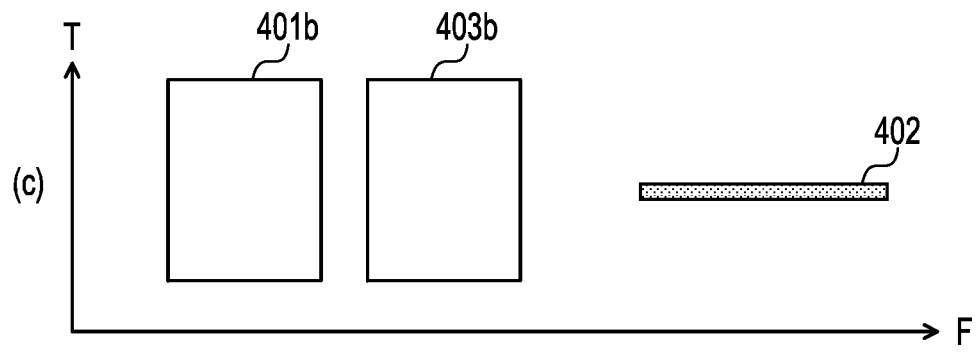

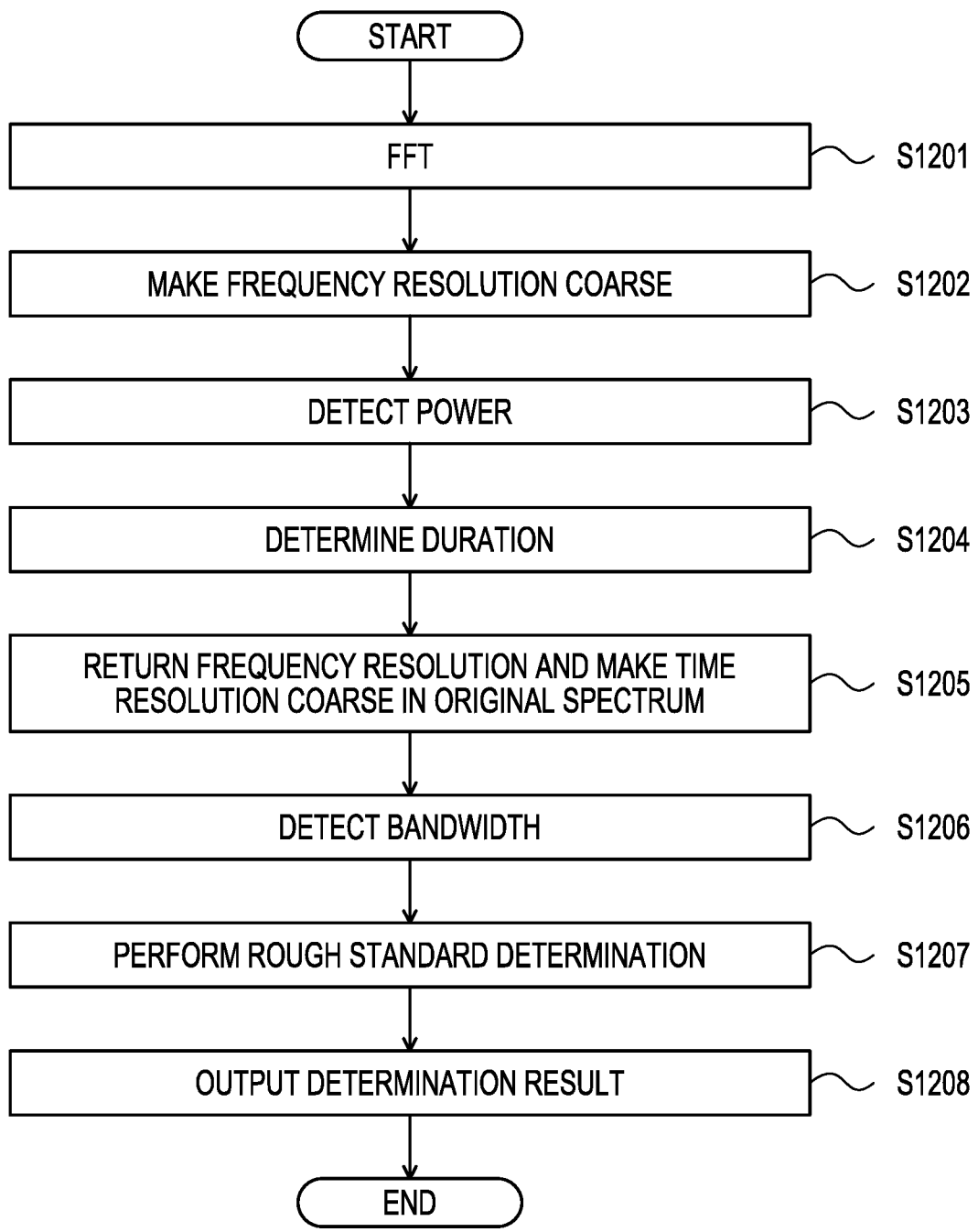

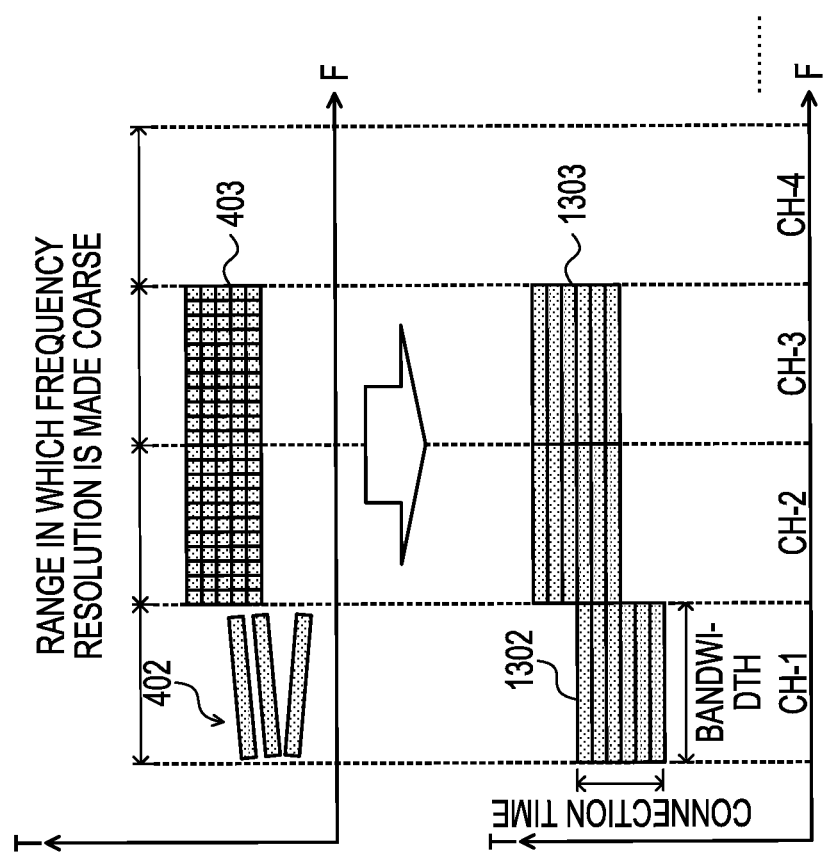
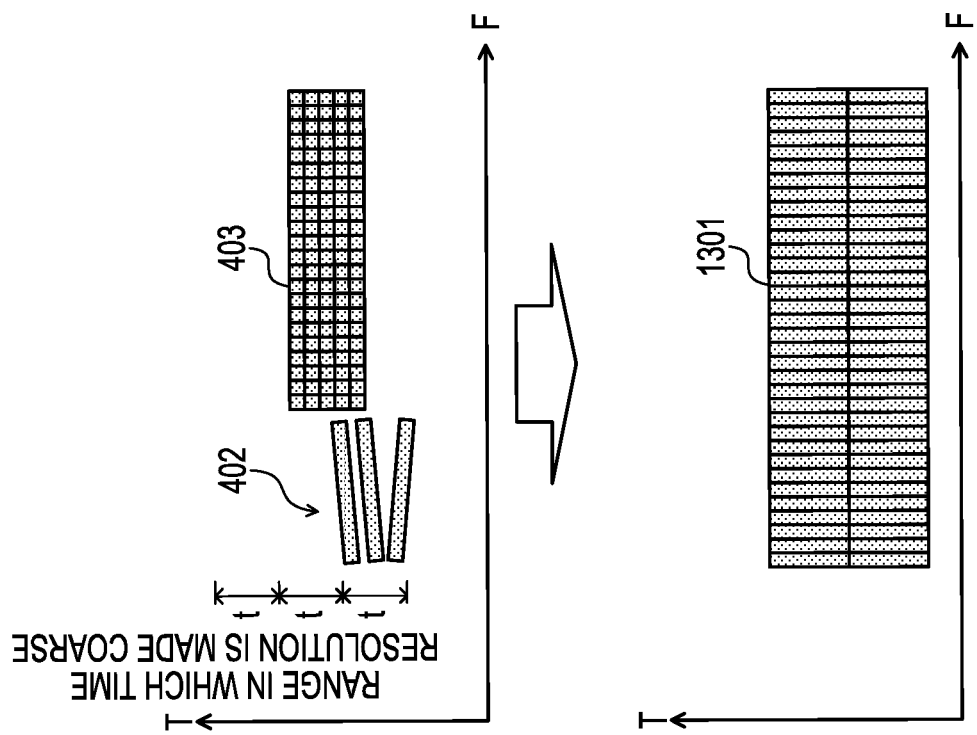

SPECTRAL ANALYSIS APPARATUS AND SPECTRAL ANALYSIS METHOD

CROSS-REFERENCE TO RELATED APPLICATION

This application is based upon and claims the benefit of priority of the prior Japanese Patent Application No. 2018-082637, filed on Apr. 23, 2018, the entire contents of which are incorporated herein by reference.

FIELD

The embodiments discussed herein are related to a spectral analysis apparatus and a spectral analysis method for analyzing the spectrum of a radio signal.

BACKGROUND

By determining and visualizing a radio standard of a radio signal that travels in the air in a local system and other systems, it is possible to estimate the state of radio interference with respect to a desired wave of the local system. Accordingly, it is possible to identify the standards of other systems which act as an interference source to the local system and to take appropriate measures against the radio interference. For example, various systems such as LoRa, Sigfox, Wi-SUN, and RFID (Radio Frequency IDentification) of LPWA (Low Power Wide Area) co-exist in a subgiga band.

A visualization apparatus that visualizes radio standards measures a bandwidth of a radio signal of each system using a spectrum and performs a primary process for roughly determining a standard according to the bandwidth. Thereafter, the visualization apparatus performs a secondary process for determining the radio standard with high accuracy using raw data of a baseband (BB) signal of the radio signal to obtain a band occupation state of each radio standard. The secondary process has higher analysis accuracy and lower analysis speed than the primary process. Through these two processes, it is possible to determine the radio standards at a high speed and with high accuracy.

As related art, there is a technique for analyzing, for example, a center frequency and a bandwidth by the spectral analysis of a radio packet in the primary process on the assumption that a pulse area of the horizontal axis (bandwidth) and the vertical axis (pulse duration) on a spectrum is "rectangular" (see, e.g., Japanese National Publication of International Patent Application No. 2005-523616). There is also a technique for adjusting a frequency resolution/a time resolution in an ultrasonic diagnostic apparatus (see, e.g., Japanese Laid-open Patent Publication No. 11-285495).

SUMMARY

According to an aspect of the embodiments, a non-transitory computer-readable recording medium storing a program that causes a computer to execute a procedure to determine a feature of each standard of a wireless environment in which radio signals including a CSS signal chirp-modulated co-exist, the procedure includes obtaining a spectrum by subjecting each radio signal to fast Fourier transform with predetermined frequency resolution and time resolution capable of visualizing a feature of the CSS signal, coarsening the frequency resolution of the spectrum by adopting an effective value in a specific frequency domain, calculating a duration of the radio signal, based on the coarsened frequency resolution of the spectrum, coarsening the time resolution of the spectrum by adopting an effective value in the duration, calculating a bandwidth of the radio signal, based on the coarsened time resolution of the spectrum, and determining the feature of the radio signal of each standard, based on the duration and the bandwidth.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view for explaining a problem in a case where a spectrum is made rectangular only by a parameter adjustment of the FFT;

FIG. 12 is a flowchart illustrating an example of an analyzing process of the spectral analysis apparatus according to the embodiment;

FIGS. 13A and 13B are views for explaining an example of a detection of each packet of congested radio signal standards by the spectral analysis apparatus according to the embodiment;

DESCRIPTION OF EMBODIMENTS

In a primary process of the visualization apparatus, there is a desire to measure the bandwidth and the duration with high resolution without deteriorating the detection sensitivity of the power of a radio signal (preventing a detection leakage) as possible. As a result, an unnecessary calculation in the secondary process may be suppressed, and appropriate interference measures may be presented.

However, in the primary process of the related art, it is not possible to analyze a CSS (Chirp Spread Spectrum)-modulated packet (CSS signal). Since the CSS signal is a sweep-shaped signal whose frequency changes (increases or decreases) linearly on the time axis, a "rectangular" pulse area may not be obtained on the spectrum. Thus, in the spectrum analyses of the related art, for example, the bandwidth of the CSS signal may not be analyzed.

As a result, in the primary process, it is not possible to measure the bandwidth and the duration with high resolution while preventing the leakage of the power detection and suppressing the deterioration of the detection sensitivity with respect to the CSS signal. Further, in a case of a wireless environment in which a CSS signal is included in another system that is an interference source to a local system, it is not possible to extract and present the feature of the CSS signal.

Here, when the primary process is performed while the CSS signal is regarded as being "rectangular," it may be conceivable to make the time resolution or the frequency resolution coarse. However, when the time resolution or the frequency resolution is merely made coarse, the resolution of the determination of the detection sensitivity, the bandwidth or the duration is deteriorated. Even when the secondary process is performed in this state, the standard of each system of the wireless environment may not be determined with the high accuracy.

Hereinafter, an embodiment of the technique capable of detecting a feature of each radio signal including a CSS signal while suppressing the deterioration of the power detection sensitivity even in a wireless environment in which CSS signals co-exist will be described in detail with reference to the accompanying drawings.

Embodiment

Figure 1:
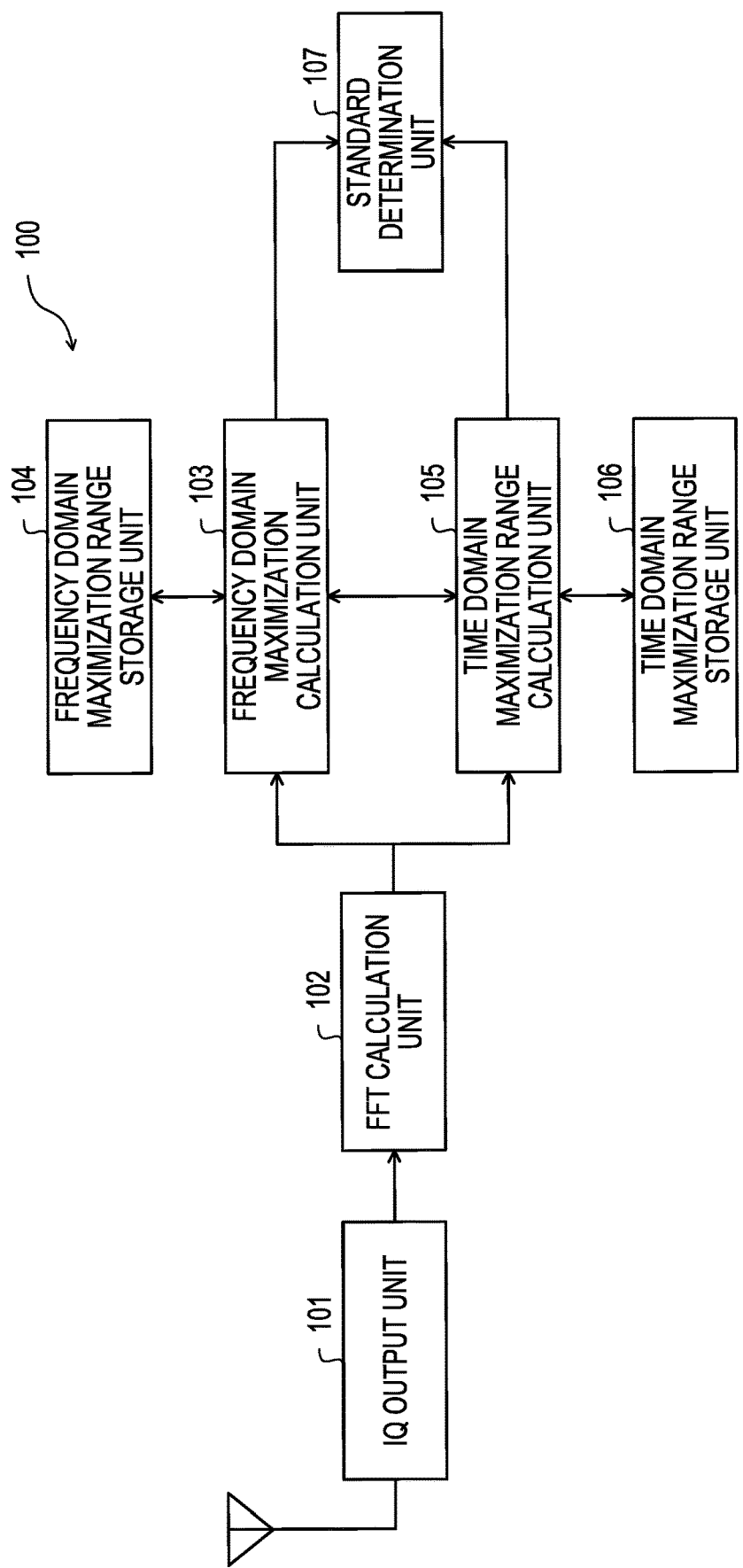
FIG. 1 is a block diagram illustrating functions of a spectral analysis apparatus according to an embodiment.

FIG. 1 is a block diagram illustrating functions of a spectral analysis apparatus according to an embodiment. A spectral analysis apparatus 100 according to the embodiment is provided in a visualization apparatus for displaying an image of a spectrum and executes the primary process described above. In addition, the visualization apparatus executes the secondary process for performing a more detailed analysis based on the result of the primary process (which will be described in detail later). Hereinafter, descriptions will be made on an example where the spectral analysis apparatus 100 mainly performs the above-described primary process of a CSS signal.

The spectral analysis apparatus 100 includes an IQ output unit 101, an FFT calculation unit 102, a frequency domain maximization calculation unit 103, a frequency domain maximization range storage unit 104, a time domain maximization range calculation unit 105, a time domain maximization range storage unit 106, and a standard determination unit 107. Each of the FFT calculation unit 102 to the standard determination unit 107 functions as an analysis unit that individually visualizes radio signals of co-existing respective standards.

The IQ output unit 101 receives radio signals of various systems which include CSS signals of the radio environments via an antenna, converts the high frequency signals of the radio signals into baseband (BB) signals, and outputs an IQ value.

The FFT calculation unit 102 performs FFT (Fast Fourier Transform) of the input IQ value. By the FFT performed by the FFT calculation unit 102, the radio signal including the CSS signal has a predetermined area on the frequency axis and the time axis which are orthogonal to each other.

The frequency domain maximization calculation unit 103 and the time domain maximization range calculation unit 105 are provided to obtain a spectrum having the feature that the output (spectrum) of the CSS signal included in the received radio signal after the FFT by the FFT calculation unit 102 is made substantially "rectangular." The feature "rectangular" refers to an area (pulse area) of a predetermined range surrounded by a bandwidth in the frequency axis direction and a duration in the time axis direction.

In order to obtain the feature (pulse area) that radio signals of various standards including the received CSS signal are made "rectangular" on a spectrum, the frequency domain maximization calculation unit 103 makes the frequency resolution of the spectrum obtained by the FFT coarse by adopting an effective value in a specific frequency domain. The frequency domain maximization range storage unit 104 stores the maximum value within the specific frequency domain obtained by the frequency domain maximization calculation unit 103 (the maximum value of the frequency domain).

In order to obtain the feature (pulse area) that radio signals of various standards including the received CSS signal are made "rectangular" on a spectrum, the time domain maximization calculation unit 105 makes the time resolution of the spectrum obtained by the FFT coarse by adopting an effective value in a duration. The time domain maximization range storage unit 106 stores the maximum value within the duration obtained by the time domain maximization calculation unit 105 (the maximum value of the time domain).

The frequency domain maximization calculation unit 103 and the time domain maximization range calculation unit 105 calculate an effective value in the frequency domain and an effective value in the time domain when the resolution of the initial setting is changed according to the change of the FFT parameters. In the embodiment, explanation will be made using the maximum value as an example of the effective values.

In addition, it is assumed that the maximum value in the frequency domain is first calculated by the frequency domain maximization calculation unit 103 for the spectrum after the FFT calculation. Then, in this case, the frequency resolution is restored to the original resolution, and the maximum value in the time domain is calculated by the time domain maximization range calculation unit 105 for the spectrum obtained by the FFT.

The standard determination unit 107 determines the standard (system) of the received radio signal. The standard determination unit 107 determines the duration of the radio signal by a power detection based on the maximum value of the frequency domain stored in the frequency domain maximization range storage unit 104. In addition, the standard determination unit 107 determines the bandwidth of the radio signal based on the maximum value of the time domain stored in the time domain maximization range storage unit 106. Then, the standard determination unit 107 determines the radio standard of the received radio signal based on the determined duration and bandwidth.

The result of the determination of the standard determination unit 107 is the result of the primary process of the visualization apparatus, and is a rough determination result. Based on the rough determination result of the standard determination unit 107, the visualization apparatus obtains the band occupation state of each radio standard using raw data of the BB signal of the radio signal, and determines the radio standard with the high accuracy.

Figure 2:
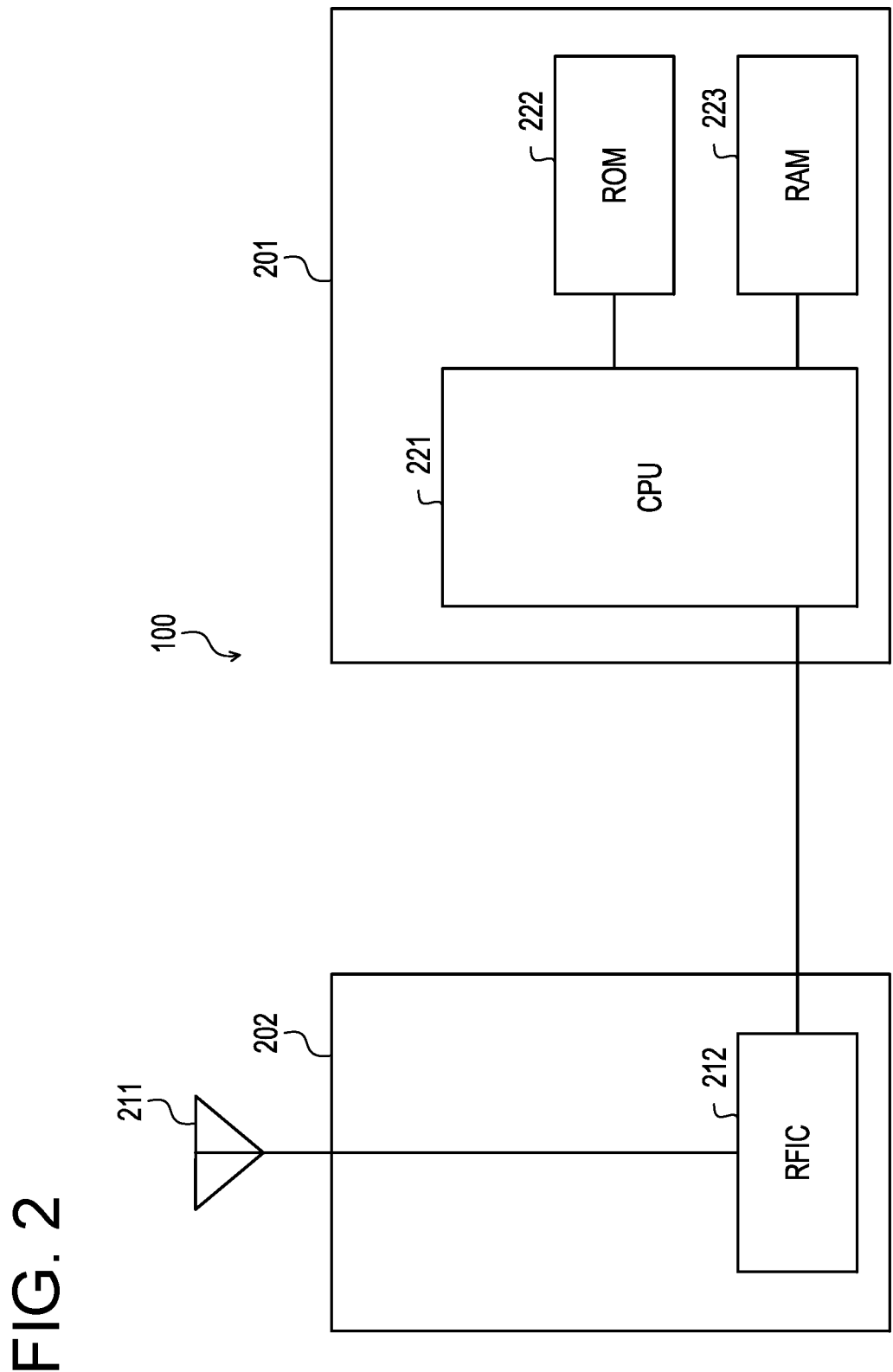
FIG. 2 is a view illustrating an example of a hardware configuration of the spectral analysis apparatus according to the embodiment.

FIG. 2 is a view illustrating an example of a hardware configuration of the spectral analysis apparatus according to the embodiment. The spectral analysis apparatus 100 includes an analysis unit 201 such as a PC or a software analysis board, and a software radio unit 202.

The software radio unit 202 includes an antenna 211 and an RFIC (Radio Frequency Integrated Circuit) 212, converts a radio signal (high frequency signal) received by the antenna 211 into a BB signal, and outputs an IQ value. The RFIC 212 implements the function of the IQ output unit 101 of the spectral analysis apparatus 100 illustrated in FIG. 1.

The analysis unit 201 includes a CPU 221, a ROM 222, and a RAM 223. Based on the IQ signal output from the software radio unit 202, the analysis unit 201 performs the analysis to visualize the radio signal, and displays and outputs a result of the analysis on, for example, a display (not illustrated).

The CPU 221 of the analysis unit 201 executes a program stored in the ROM 222. At this time, the CPU 221 uses the RAM 223 as a working data area to implement the respective functions of the spectral analysis apparatus 100 (the FFT calculation units 102 to the standard determination unit 107).

Figure 3:
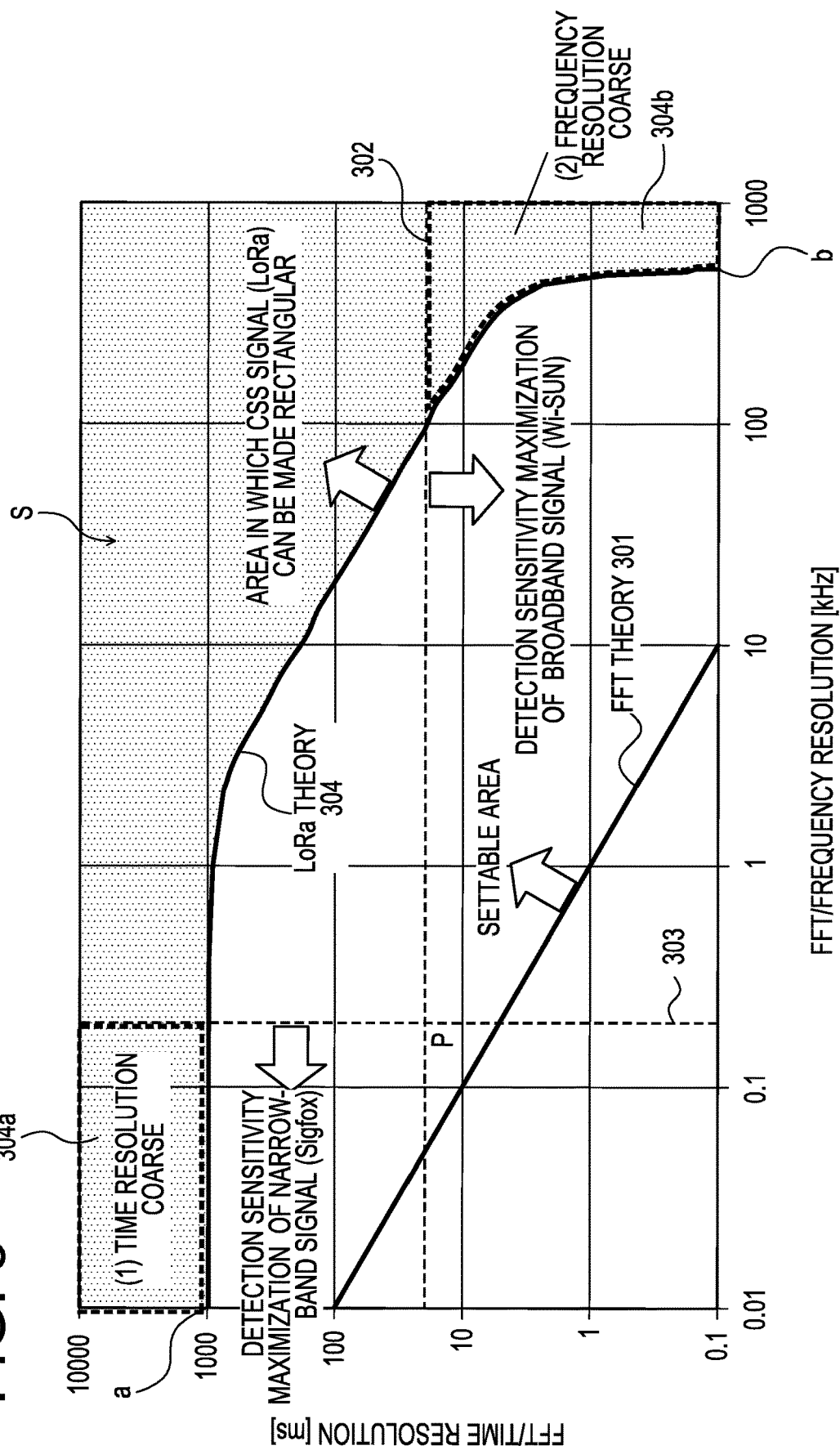
FIG. 3 is a view illustrating an example of a parameter setting of the fast Fourier transform (FFT) for detecting various radio signals in the spectral analysis apparatus according to the embodiment.

FIG. 3 is a view illustrating an example of a parameter setting of the FFT for detecting various radio signals in the spectral analysis apparatus according to the embodiment. The horizontal axis represents the frequency resolution [kHz] (bandwidth), and the vertical axis represents the time resolution [ms] (duration). According to the FFT theory (Y=1/X), an area that may be set in the FFT calculation unit 102 is the area of the upper right portion of the figure from a line 301 of the FFT theory. In the FFT parameter setting in the area of the lower left portion of the figure from the line 301 of the FFT theory, the pulse area where all of the respective standards of the radio signals are made "rectangular" may not be obtained.

In addition, in the area of the lower portion of the figure from a line 302, the detection sensitivity of a broadband signal (e.g., Wi-SUN) of a radio signal is maximized. Further, in the area of the left side of the figure from a line 303, the detection sensitivity of a narrowband signal (e.g., Sigfox) of a radio signal is maximized.

Here, an area where both the narrowband signal and the broadband signal are detectable without the deterioration of the detection sensitivity is an area P located below the line 302 and in the left side of the line 303. However, when an FFT is performed with the setting parameters of the area P, the CSS signal is not detectable, and it is necessary to perform FFT again by changing the setting parameters into setting parameters with which the CSS is detectable.

In addition, as a result of consideration by, for example, the present inventors, it has been grasped that an area where the CSS signal (e.g., LoRa) may be made rectangular is an area S of the upper right portion of the figure from a line 304 of the LoRa theory illustrated in FIG. 3. The line 304 of the LoRa theory is a nonlinear curve that connects one end "a" and the other end "b."

As illustrated in FIG. 3, the setting parameters (frequency resolution and time resolution) of the FFT are different for the respective standards of the radio signals. Further, by setting the parameters of an FFT (the FFT calculation unit 102), it is possible to obtain the pulse area where the CSS signal is regarded as being "rectangular." That is, by setting the parameters in the area S of the upper right portion of the figure from the line 304 of the LoRa theory, the CSS signal may be made "rectangular," and a feature extraction (a spectrum of a rectangular pulse area formed with a bandwidth and a pulse duration) may be obtained.

Then, in addition to the detection of the CSS signal, a pulse area of the narrowband signal is detectable in (1) an area 304a with coarse time resolution within the area S of the upper right portion of the figure from the line 304 of the LoRa theory. Further, in addition to the CSS signal, a pulse area of the broadband signal is detectable in (2) an area 304b with coarse frequency resolution within the area S of the upper right portion of the figure from the line 304 of the LoRa theory.

Here, when only the time resolution or the frequency resolution is set to be coarse without using the parameter setting of the line 304 (the area S) of the LoRa theory according to the embodiment, the detection sensitivity, the bandwidth or the duration resolution are also deteriorated. This problem will be explained below.

FIG. 4 is a view for explaining the problem in a case where a spectrum is made rectangular only by the parameter adjustment of the FFT. In FIG. 4, (a) illustrates spectrums of packets according to standards of various radio signals. The horizontal axis represents a frequency F (frequency), and the vertical axis represents time T (time). For the sake of convenience, the standards of the respective radio signals are aligned at different frequency portions on the horizontal axis. However, the standards of the radio signals appear at respective corresponding positions. An FFT is not limited to the transform according to the frequency and the time to be described below, but may perform a transform according to the bandwidth and the time duration.

As illustrated in (a) of FIG. 4, a narrowband packet 401 such as Sigfox is a narrowband with a bandwidth of, for example, up to 200 Hz. In addition, a broadband packet 402 such as Wi-SUN has a plurality of bands on different time axes, each of which is a broadband with a bandwidth of up to 200 kHz. Further, a CSS signal packet 403 such as LoRa has a plurality of sweep-like bands which continuously change with respect to both the time axis and the frequency axis.

When the time resolution is made coarse, as illustrated in (b) of FIG. 4, there is no influence on the narrowband packet 401, but a broadband packet 402a and a CSS signal packet 403a are superimposed with noise components, which deteriorates the detection sensitivity. In addition, the resolution of the duration determination is also deteriorated. At this time, the pulse areas of the broadband packet 402a and the CSS signal packet 403a are elongated in the time axis direction, and it becomes difficult to see the pulse areas as it is visually blurred, and, in particular, the duration of the pulse areas becomes unclear.

Meanwhile, when the frequency resolution is made coarse, as illustrated in (c) of FIG. 4, there is no influence on the broadband packet 402, but a narrowband packet 401b and a CSS signal packet 403b are superimposed with noise components, which deteriorates the detection sensitivity. In addition, the resolution of the bandwidth determination is also deteriorated. At this time, the pulse areas of the narrowband packet 401b and the CSS signal packet 403b become difficult to be seen as visually blurred, in particular, the bandwidths become unclear.

FIGS. 5 to 8 are explanatory views of a process for detecting pulse areas of various radio signals in the spectral analysis apparatus according to the embodiment.

The spectral analysis apparatus 100 according to the embodiment performs the process in an order of the following Steps 1 to 5. Step 1. Perform the FFT of a received radio signal with a desired resolution. Step 2. Make the frequency resolution coarse by adopting a maximum value in a specific frequency domain so as to make a CSS signal "rectangular" on a spectrum. Step 3. Calculate the duration in the time direction. Step 4. Return the frequency resolution to the resolution of Step 1 and make the time resolution coarse by adopting a maximum value of the duration. Step 5. Calculate the bandwidth in the frequency direction.

First, in Step 1, the spectral analysis apparatus 100 performs an FFT of a received radio signal with a desired resolution capable of detecting both the narrowband packet 401 and the broadband packet 402 with the high sensitivity. Specifically, the FFT calculation unit 102 performs the FFT by setting the setting parameters (frequency resolution and time resolution) of the FFT in the area S of the upper right portion of the figure from the line 304 of the LoRa theory illustrated in FIG. 3.

Figure 5:
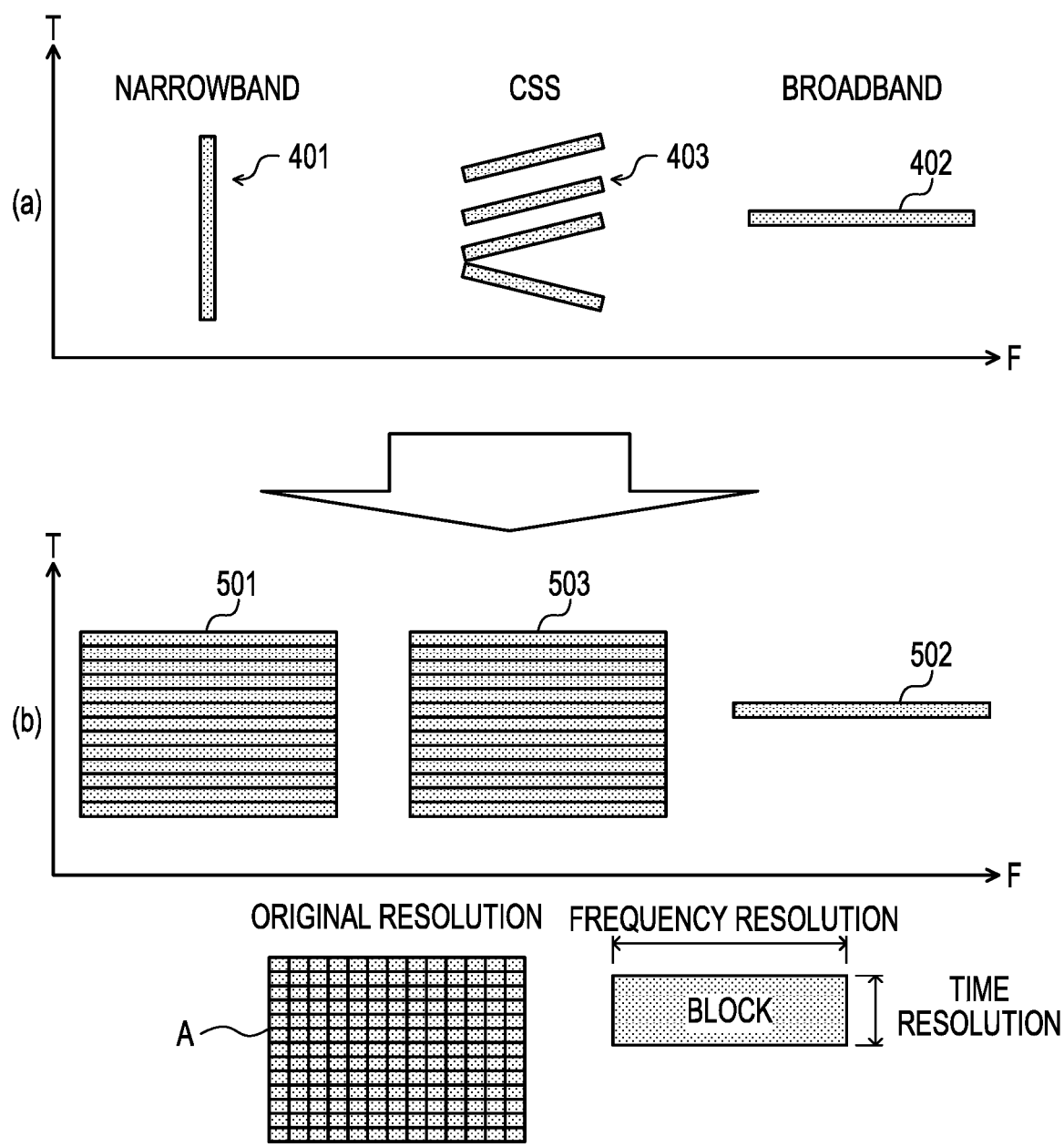
FIG. 5 is an explanatory view of a process for detecting pulse areas of various radio signals in the spectral analysis apparatus according to the embodiment (Part 1)

Next, in Step 2, as illustrated in FIG. 5, the spectral analysis apparatus 100 performs a first process for making the CSS signal "rectangular" on the spectrum. In FIG. 5, (a) is the same as (a) of FIG. 4.

Here, as illustrated in (b) of FIG. 5, the spectral analysis apparatus 100 (the frequency domain maximization calculation unit 103) makes the frequency resolution coarse ((2) the area where the frequency resolution is coarse, in FIG. 3) by adopting the maximum value in the specific frequency domain in the FFT result (spectrum). As a result, for example, in the broadband packet 402, the resolution of the pulse area does not change before and after the frequency resolution is made coarse (one block 502). Meanwhile, the narrowband packet 401 and the CSS signal packet 403 are converted into plural rectangular blocks 501 and 503 which are divided and stacked on the time axis with a fixed size (specific frequency domain) on the frequency axis. Here, each of the blocks 501 to 503 holds the maximum value of the spectral power value out of plural slots within the specific frequency domain of the blocks 501 to 503.

Each of the blocks 501 to 503 has a predetermined (coarse) frequency resolution in the frequency axis direction and a predetermined time resolution in the time axis direction in correspondence to the plural slots. Each of the blocks 501 to 503 is obtained by making the frequency resolution coarse in the frequency axis direction, as compared with the original resolution (the desired resolution in Step 1) A.

The ranges of each of the blocks 501 to 503 on the time axis and the frequency axis which are obtained by the calculation of the frequency domain maximization calculation unit 103 are stored in the frequency domain maximization range storage unit 104.

Figure 6:
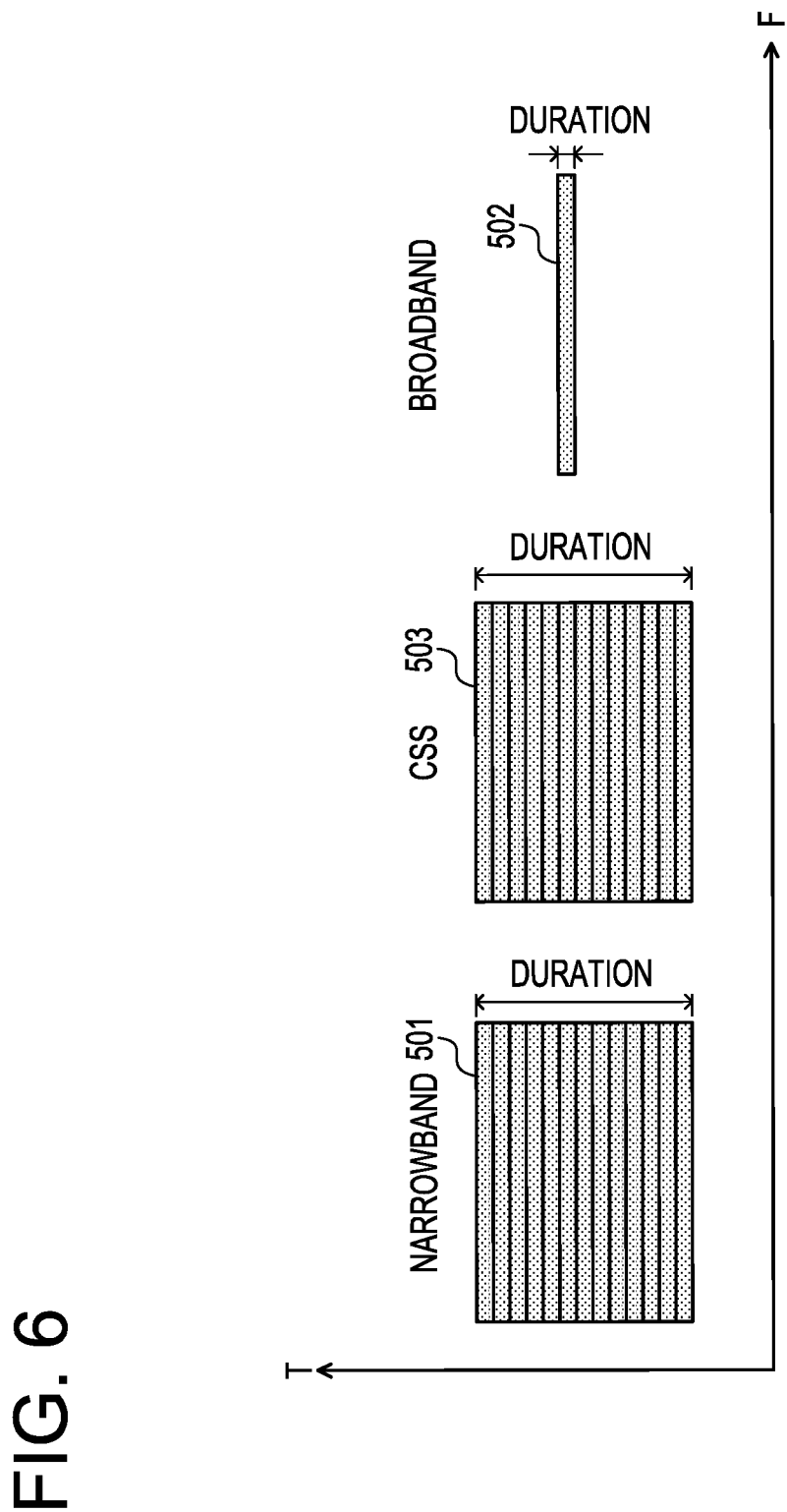
FIG. 6 is an explanatory view of a process for detecting pulse areas of various radio signals in the spectral analysis apparatus according to the embodiment (Part 2)

Next, in Step 3, as illustrated in FIG. 6, the spectral analysis apparatus 100 calculates the duration in the time direction for each of the blocks 501 to 503. At this time, the spectral analysis apparatus 100 (the standard determination unit 107) calculates the duration by the number of blocks included in each group of the blocks 501 to 503 through, for example, an image processing.

For example, in the example of FIG. 6, in the block 502 of the broadband packet 402, the duration corresponding to the single block is calculated. Further, in the blocks 501 and 503 corresponding to the narrowband packet 401 and the CSS signal packet 403, the duration is calculated based on the number of blocks stacked in the time axis direction. The standard determination unit 107 holds the durations corresponding to the packets 401 to 403 of the radio signals, respectively.

Figure 7:
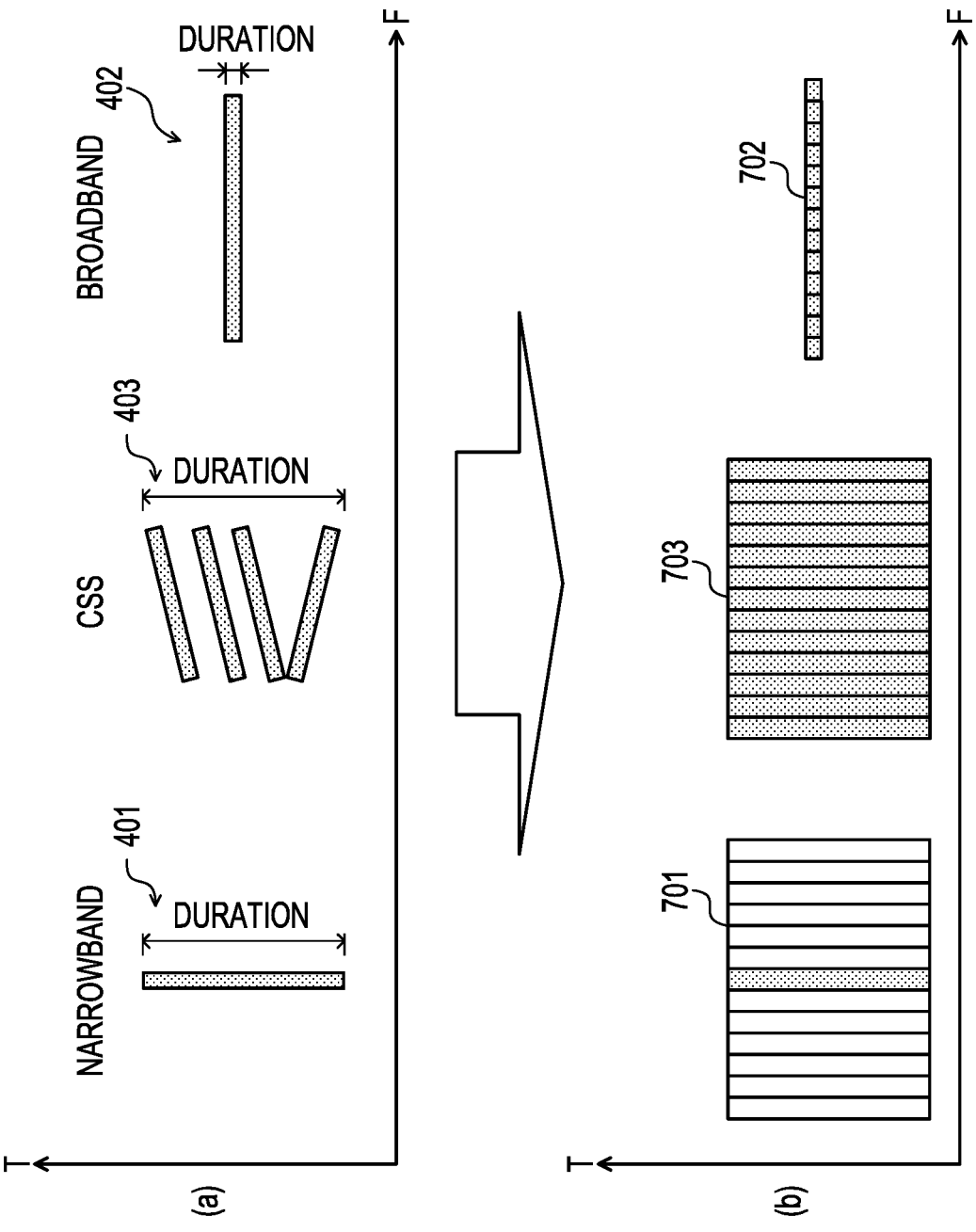
FIG. 7 is an explanatory view of a process for detecting pulse areas of various radio signals in the spectral analysis apparatus according to the embodiment (Part 3)

Next, in Step 4, as illustrated in FIG. 7, the spectral analysis apparatus 100 performs a second process for making the CSS signal "rectangular" on the spectrum. In FIG. 7, (a) is the same as (a) of FIG. 4.

Next, as illustrated in (a) of FIG. 7, the spectral analysis apparatus 100 returns the frequency resolution to the initial resolution of Step 1. Thereafter, as illustrated in (b) of FIG. 7, the spectral analysis apparatus 100 (the time domain maximization range calculation unit 105) makes the time resolution coarse by adopting the maximum value in the duration in the FFT result (spectrum).

Thus, for example, the narrowband packet 401 is converted into plural rectangular blocks 701 which are divided on the horizontal frequency axis with a fixed size corresponding to the duration on the vertical time axis. The broadband packet 402 is converted into plural rectangular blocks 702 which are divided on the horizontal frequency axis with a fixed size corresponding to the duration on the vertical time axis. The CSS signal packet 403 is also converted into plural rectangular blocks 703 divided on the horizontal frequency axis with a fixed size corresponding to the duration on the vertical time axis.

Each of the blocks 701 to 703 has a predetermined frequency resolution in the frequency axis direction and also a coarse time resolution in the time axis direction in correspondence to the plural slots ((1) the area where the time resolution is coarse, in FIG. 3). Each of the blocks 701 to 703 is obtained by making the time resolution coarse in the time axis direction, as compared with the initial resolution (the desired resolution in Step 1) A.

The ranges of each of the blocks 701 to 703 on the time axis and the frequency axis which are obtained by the calculation of the time domain maximization range calculation unit 105 are stored in the time domain maximization range storage unit 106.

Figure 8:
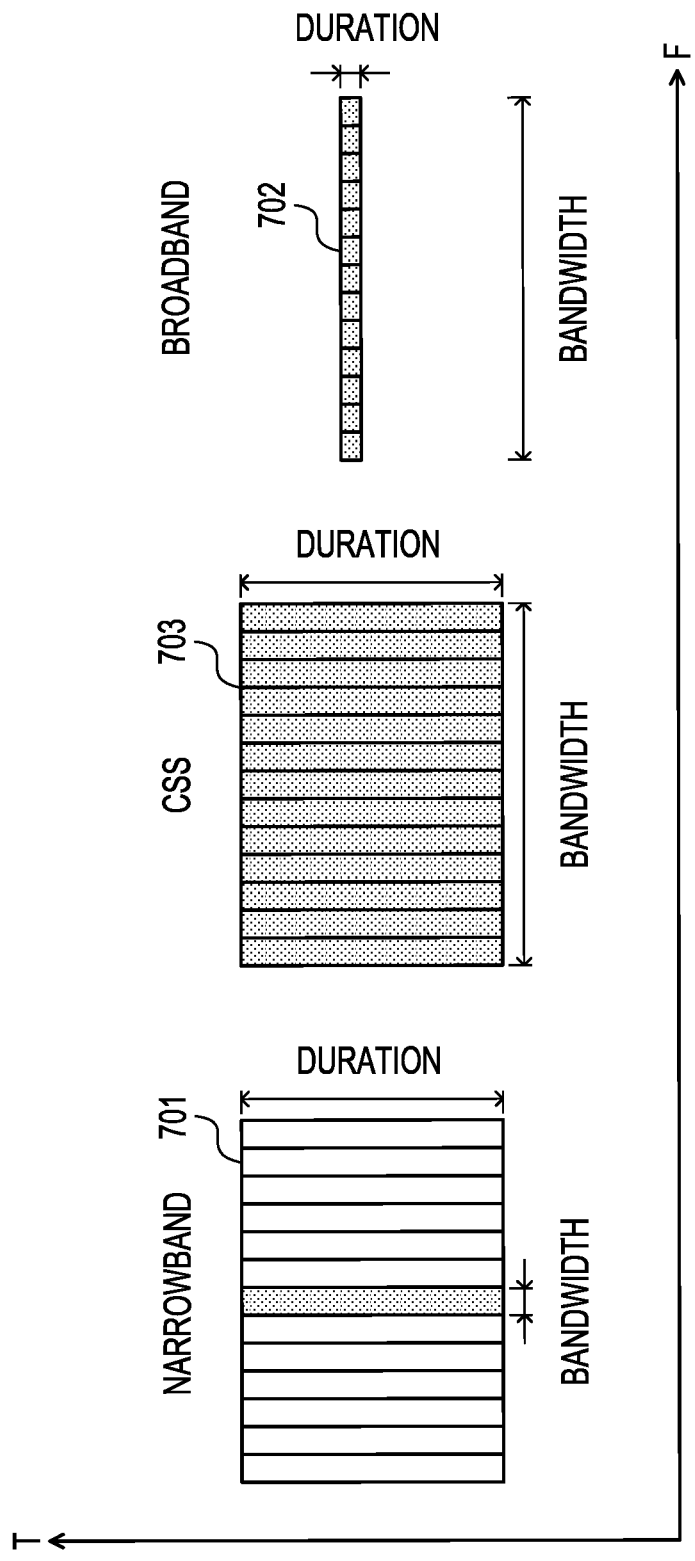
FIG. 8 is an explanatory view of a process for detecting pulse areas of various radio signals in the spectral analysis apparatus according to the embodiment (Part 4)

Finally, as illustrated in FIG. 8, the spectral analysis apparatus (the standard determination unit 107) calculates the bandwidth in the frequency direction as in Step 5. As illustrated in FIG. 7, each of the blocks 701 to 703 has a predetermined duration in the time axis direction. Further, each of the blocks 701 to 703 has a predetermined bandwidth in the frequency axis direction illustrated in FIG. 8. The standard determination unit 107 calculates the bandwidth of each of the blocks 701 to 703 by determining the size of the pulse area of each of the blocks 701 to 703 through, for example, an image processing. In the example of FIG. 8, the blocks 701 corresponding to the narrowband packet 401 are in a state in which only one central block is subjected to predetermined spectral power (detection output), and the bandwidth corresponding to the one block is obtained.

Thus, for each of the narrowband packet 401, the broadband packet 402, and further the CSS signal packet 403, it is possible to obtain a pulse area formed with the duration and the bandwidth for each radio signal standard.

Figure 9:
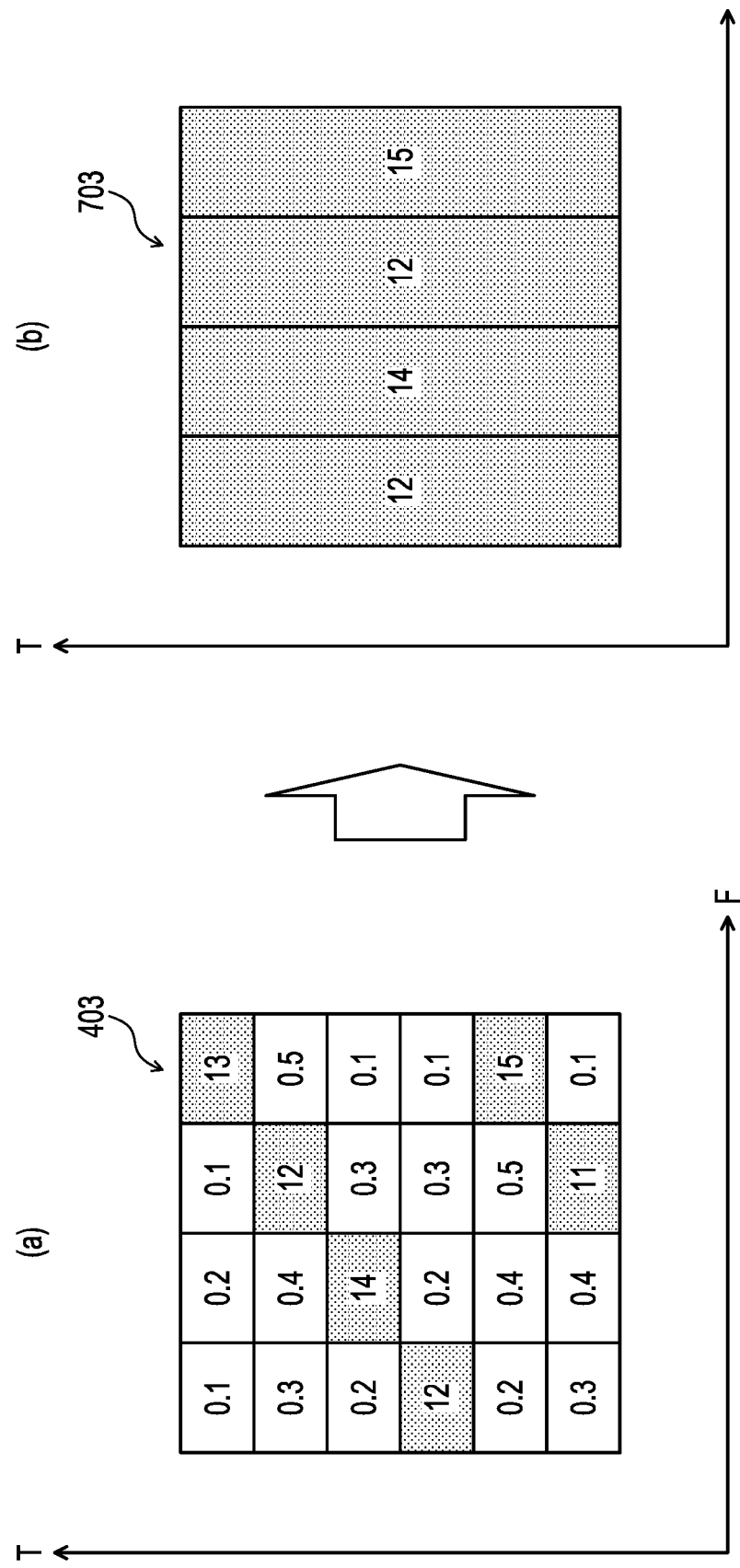
FIG. 9 is a view illustrating an example in which a resolution is set to be coarse using a maximum value in the spectral analysis apparatus according to the embodiment.

FIG. 9 is a view illustrating an example in which a resolution is set to be coarse using a maximum value in the spectral analysis apparatus according to the embodiment. In FIG. 9, (a) is a view illustrating a spectral power value of the CSS signal packet 403 in the unit of slots (specific frequencies and time). As illustrated, it is assumed that the CSS signal packet 403 has a chirp with a spectral power increasing from the lower left toward the upper right.

In this case, when the time resolution is made coarse by adopting the maximum value in the spectral analysis apparatus 100, among the spectral powers divided in plural (4×6) frequency axes and time axes illustrated in (a) of FIG. 9, the maximum value on the time axis is adopted. For example, "12" is adopted as the maximum value for six spectral powers along the time axis direction on the frequency axis of the leftmost side (low frequency side), and "15" is adopted as the maximum value for six spectral powers along the time axis direction on the frequency axis of the rightmost side (high frequency side).

As a result, as illustrated in (b) of FIG. 9, the spectral analysis apparatus 100 (the time domain maximization range calculation unit 105) sets four maximum values "12," "14," "12," and "15" along the frequency axis direction.

FIG. 9 illustrates an example in which the time resolution is set to be course by using the maximum values. In the same way, the frequency resolution may also be set to be coarse by using the maximum values.

Figure 10:
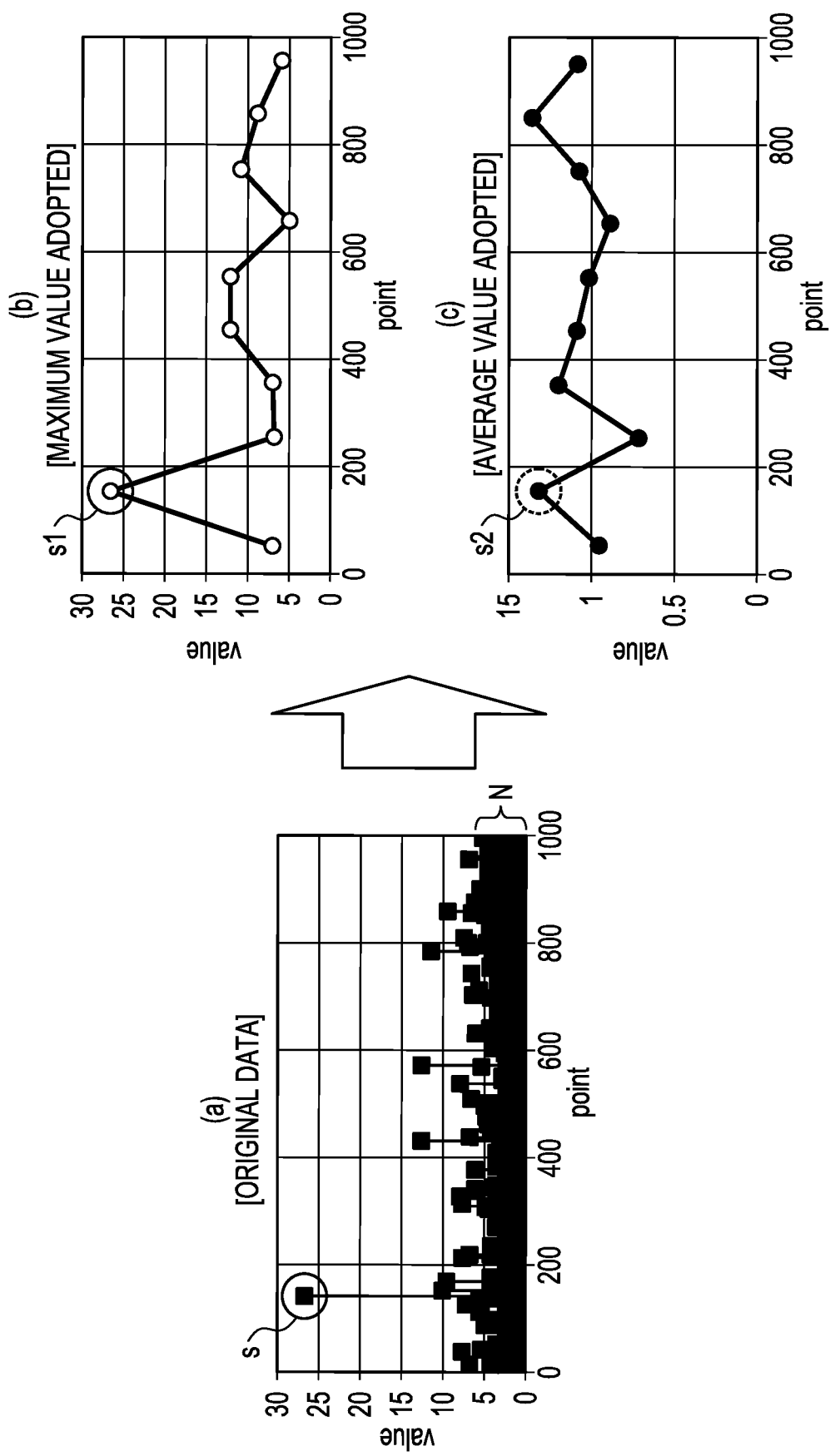
FIG. 10 is a view for explaining the effect obtained from adopting a maximum value of a spectrum power in the spectral analysis apparatus according to the embodiment (Part 1)
Figure 11:
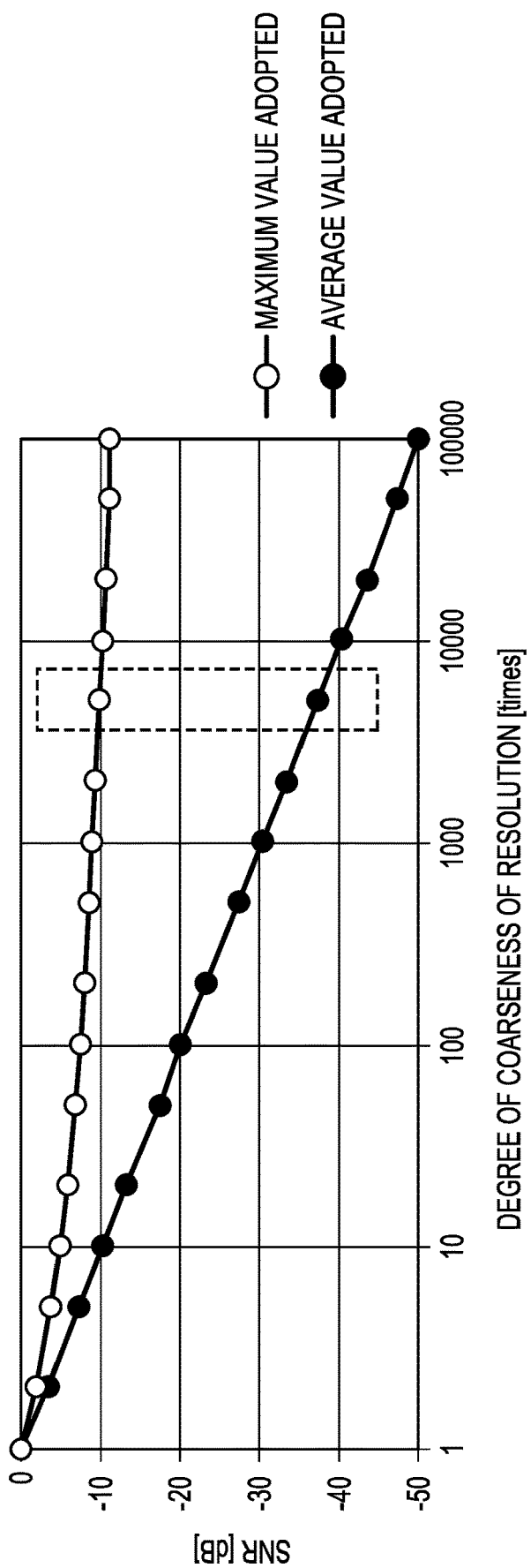
FIG. 11 is a view for explaining the effect obtained from adopting a maximum value of a spectrum power in the spectral analysis apparatus according to the embodiment (Part 2)

FIGS. 10 and 11 are views for explaining the effect obtained from adopting the maximum value of the spectral power in the spectral analysis apparatus according to the embodiment. In FIG. 10, the horizontal axis represents each point (frequency or time [point]) in the FFT calculation, and the vertical axis represents signal intensity [value]. In FIG. 10, (a) is a view illustrating the original signal (data) of the received radio signal, in which a signal component "s" protrudes at a predetermined point on a noise N.

In addition, (b) of FIG. 10 illustrates a state in a case where the maximum value of the spectral power is adopted when the resolution is made coarse as described above. As illustrated in (b) of FIG. 10, the signal intensity of a signal component s1 at a point where the maximum value is adopted is higher in protrusion level than the signal intensity at the other points, making it difficult for the signal component s1 to be embedded in the noise. In this way, by adopting the maximum value when the resolution is made coarse, it is possible to suppress the deterioration of the reception sensitivity of the spectral analysis apparatus 100.

Meanwhile, (c) of FIG. 10 is a view illustrating a state when the average value of spectral powers is adopted when the resolution is made coarse. In this case, the signal intensity of a signal component s2 at a point where the average value is adopted has a small difference from the signal intensity at the other points, so that the signal component s2 is easily embedded in the noise.

FIG. 11 is a diagram illustrating the degree of deterioration of reception sensitivity in a subgiga band. The horizontal axis represents the degree of coarseness of resolution [times] and the vertical axis represents SNR (Signal-Noise Ratio) [dB]. FIG. 11 represents simulation results when the resolution is gradually made coarse with SNR at the original resolution=0 dB. In FIG. 11, for example, when the resolution is made coarse 1,000 times, the SNR in a case where the average value of spectral powers is adopted is −30 dB, whereas the SNR in a case where the maximum value of the spectral powers is adopted is −10 dB or less. In this case, a difference of 20 dB occurs, and the difference becomes large as the resolution becomes coarser.

FIG. 12 is a flowchart illustrating an example of an analyzing process of the spectral analysis apparatus according to the embodiment. The process to be described below is sequentially executed by, for example, the CPU 221 of the analysis unit 201 illustrated in FIG. 2.

First, the CPU 221 performs the FFT on a BB signal of the RFIC 212, which is obtained by processing a received radio signal, at a desired resolution (Operation S1201) to obtain an FFT result (spectrum). The resolution at this time is set to a resolution at which both the narrowband packet 401 and the broadband packet 402 are detectable with the high sensitivity (e.g., within the range of the area S in FIG. 3).

Next, the CPU 221 makes the frequency resolution coarser than the resolution used in Operation 1201 (Operation S1202), and detects the spectral power (electric power) at this time (Operation S1203). At this time, the CPU 221 adopts the maximum value of the spectral power within a specific frequency domain to make the frequency resolution coarse.

Next, the CPU 221 determines the duration obtained when the frequency resolution is made coarse (Operation S1204, see FIG. 6).

Next, the CPU 221 returns the frequency resolution to the original state (the resolution at the execution time of Operation S1201), makes the time resolution coarse in the original spectrum (Operation S1205), and determines the bandwidth by the spectral power at this time (Operation S1206, see FIG. 8). At this time, the CPU 221 adopts the maximum value of the spectral power within the duration to make the time resolution coarse.

Next, the CPU 221 performs a rough standard determination (Operation S1207). That is, in the above-described primary process, based on the pulse area having the detected duration and bandwidth, the CPU 221 determines the standard of each received radio signal. Then, the CPU 221 outputs a result of the determination (Operation S1208) and ends the above-described primary process. The determination result output in the primary process is output to a processor which performs the secondary process of the visualization apparatus. In the secondary process, a preamble correlation calculation is performed on the raw data of the BB signal of the radio signal to determine the radio standard with the high accuracy, and the bandwidth occupation state of each radio standard is obtained. In addition, the spectral analysis apparatus 100 according to the embodiment may execute not only the primary process but also the secondary process.

In the above example of the analyzing process, first, the frequency resolution of the FFT result (spectrum) is made coarse to determine the duration time, then the frequency resolution is returned to the original state, and the time resolution is made coarse to determine the bandwidth. Without being limited thereto, the order of analysis may be changed such that the time resolution of the FFT result (spectrum) is made coarse first to determine the bandwidth, then the time resolution is returned to the original state, and the frequency resolution is made coarse to determine the duration.

FIGS. 13A and 13B are views for explaining an example of packet detection of congested radio signal standards by the spectral analysis apparatus according to the embodiment. In FIGS. 13A and 13B, the horizontal axis represents frequency F, and the vertical axis represents time T. The upper half of FIG. 13A represents an example in which radio signals of different standards, for example, the CSS signal packet 403 and the broadband packet 402, are adjacent to each other in the frequency axis direction.

In this way, in the radio environment where the radio signals are congested, it is assumed that the resolution is made coarse by the above-described process (corresponding to the process in Step 2; t: a range in which the time resolution is made coarse). In this case, as illustrated in the lower half of FIG. 13A, the CSS signal packet 403 and the broadband packet 402 appear as a block 1301 of an integrated pulse area. In this case, the standard determination to distinguish the CSS signal packet 403 and the broadband packet 402 from each other may not be performed. In addition, since the time when a packet of a radio signal arrives is not determined, the range of the time resolution may not be determined for the arrival of each packet.

However, in a band where a channel (CH) is a defined, a packet exists only in a range defined in the unit of CH. In the embodiment, this CH definition is used.

That is, when the frequency resolution is made coarse in Step 2, as illustrated in the upper half of FIG. 13B, a range in which the frequency resolution is made coarse is determined by the CH bandwidth defined by the band of the received radio signal or an integer fraction of the CH bandwidth.

As a result, as illustrated in the lower half of FIG. 13B, a block 1303 of a pulse area corresponding to the CSS signal packet 403 and a block 1302 of a pulse area corresponding to the broadband packet 402 may be represented as different blocks. This makes it possible to perform the standard determination to distinguish the block of the CSS signal packet 403 and the block of the broadband packet 402 from each other.

Figure 14:
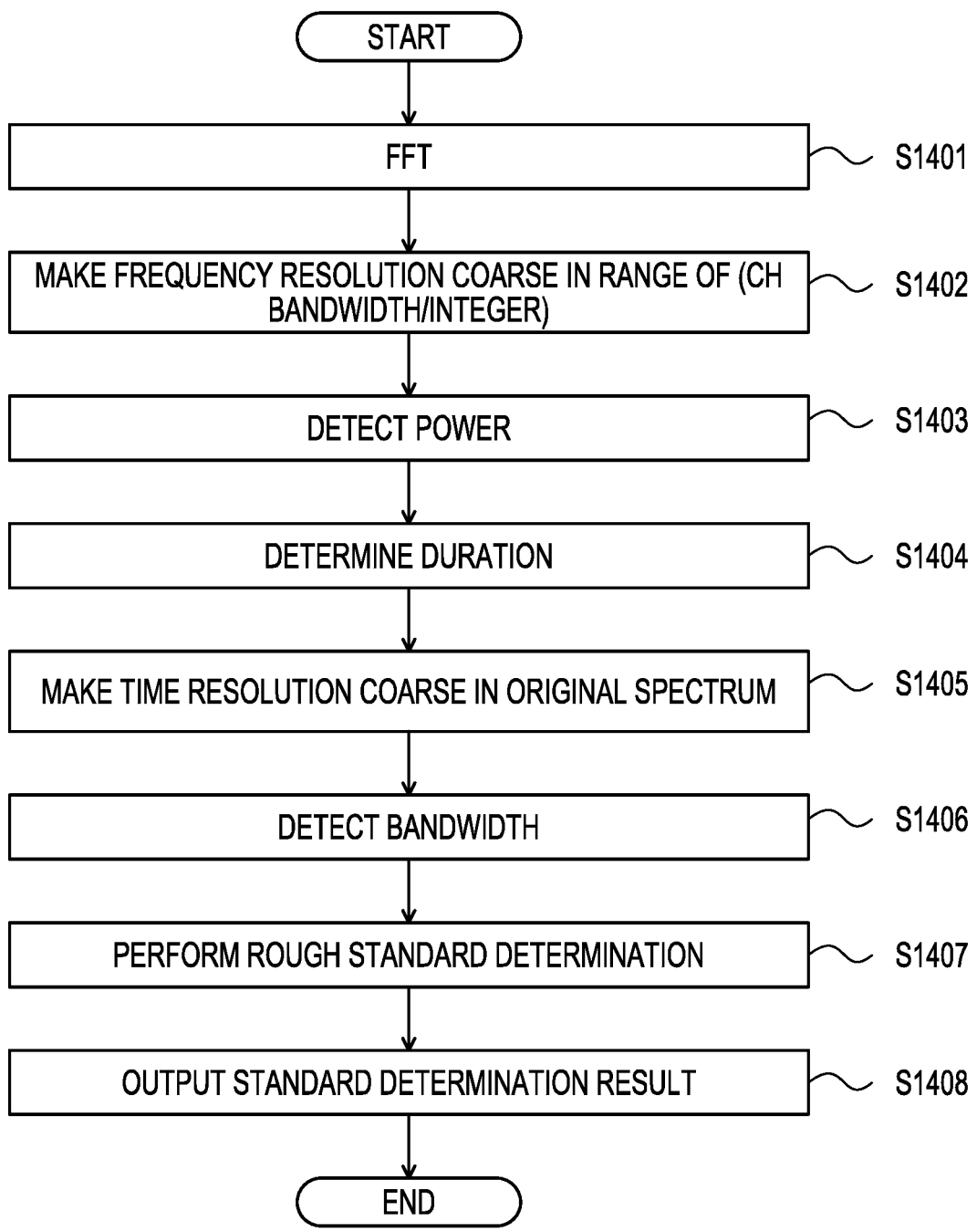
FIG. 14 is a flowchart illustrating an example of a process of analyzing congested radio signals by the spectral analysis apparatus according to the embodiment.

FIG. 14 is a flowchart illustrating an example of a process of analyzing congested radio signals by the spectral analysis apparatus according to the embodiment. The process to be described below is sequentially executed by, for example, the CPU 221 of the analysis unit 201 illustrated in FIG. 2.

First, the CPU 221 performs an FFT on a BB signal of the RFIC 212, which is obtained by processing a received radio signal, at a desired resolution (Operation S1401) to obtain an FFT result (spectrum). The resolution at this time is set to a resolution at which both the narrowband packet 401 and the broadband packet 402 are detectable with the high sensitivity (e.g., within the range of the area S in FIG. 3).

Next, the CPU 221 makes the frequency resolution coarser than the resolution used in Operation 1401 (Operation S1402), and detects the spectral power (electric power) at this time (Operation S1403). At this time, the CPU 221 makes the frequency resolution coarse in a range of the CH bandwidth or an integer fraction of the CH bandwidth.

Next, the CPU 221 determines the duration obtained when the frequency resolution is made coarse (Operation S1404, see FIGS. 13A and 13B).

Next, the CPU 221 returns the frequency resolution to the original state (the resolution at the execution time of Operation S1401), makes the time resolution coarse in the original spectrum (Operation S1405), and detects the bandwidth by the spectral power at this time (Operation S1406, see FIGS. 13A and 13B). At this time, the CPU 221 adopts the maximum value of the spectral power within the duration to make the time resolution coarse.

Next, the CPU 221 performs a rough standard determination (Operation S1407). That is, in the above-described primary process, based on the pulse area having the detected duration and bandwidth, the CPU 221 determines the standard of each received radio signal. Then, the CPU 221 outputs a result of the determination (Operation S1408) and ends the above-described primary process. The determination result output in the primary process is output to a processor which performs the secondary process of the visualization apparatus.

Figure 15B:
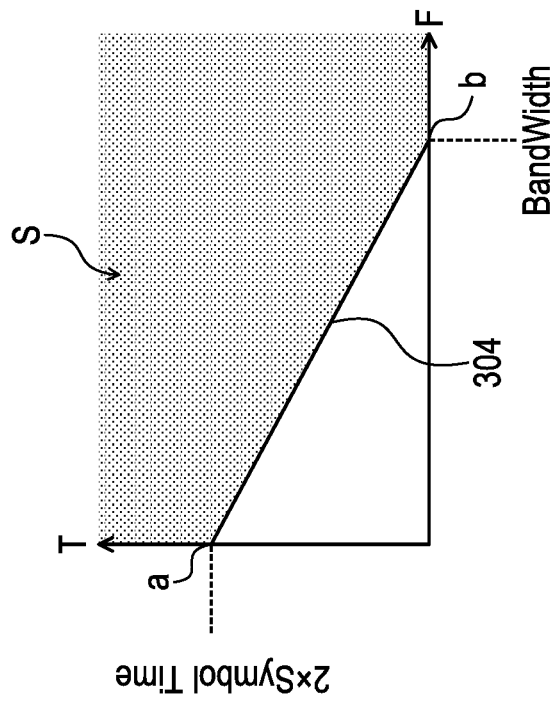
FIGS. 15A and 15B are explanatory views of an example in which a CSS signal is made rectangular by the spectral analysis apparatus according to the embodiment.
Figure 15A:
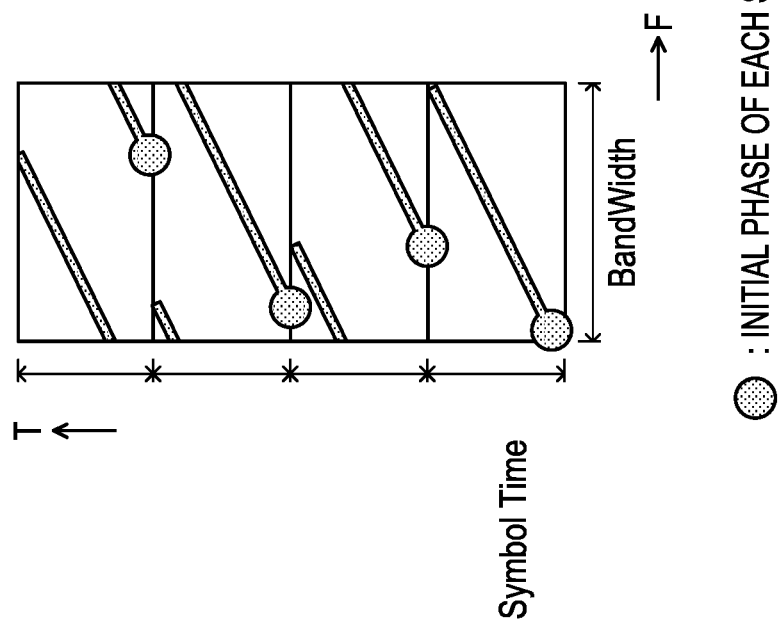

FIGS. 15A and 15B are explanatory views of an example in which a CSS signal is made rectangular by the spectral analysis apparatus according to the embodiment. In FIGS. 15A and 15B, the horizontal axis represents a frequency F, and the vertical axis represents time T. FIG. 15A illustrates LoRa as the CSS signal. LoRa is a radio system that performs chirping with a specific determined frequency change rate (BandWidth/Symbol Time) to determine an initial phase (frequency) for each symbol (Symbol), and performs a modulation by adding bit information to the initial phase. In the figure, the symbol denotes the initial phase of each symbol. BandWidth indicates a bandwidth BW, and Symbol Time indicates a time width ST.

FIG. 15B illustrates an area in which a CSS signal is made "rectangular." By setting a range of the processes for making the resolution coarse (Operation S1202, Operation S1205, Operation S1402, and Operation S1405) to an area S in FIG. 15B, it is possible to make the CSS signal "rectangular." In the area S, one end "a" indicates 2×Symbol Time, and the other end "b" indicates BandWidth (BW: bandwidth). In the example of FIG. 15B, the area S is defined by a line 304 on a straight line connecting the one end "a" and the other end "b." More specifically, as illustrated in FIG. 3, the area S corresponds to the area S of the upper right portion of the figure from the line 304 of the LoRa theory.

[Example of Setting of Range in which CSS Signal is Made Rectangular]

Next, an example of setting of the time or frequency parameter for making a spectrum "rectangular" will be described with reference to FIGS. 16 to 20. Here, an example of setting of a "range in which (time or frequency) is made coarse by adopting a maximum value" with respect to the above-described CSS signal (LoRa) will be described. In the following description, the above-described "slot" will be described as a "rectangularization bin."

In the embodiment, when a "range in which FFT is made coarse by adopting a maximum value" is defined as a slot, the range is determined such that the energy of the CSS signal (LoRa) is included in any slot within a pulse area where the CSS signal exists.

[Constraints of Spectrum Rectangularization Parameters for LoRa Detection]

The spectrum of LoRa has a sweep shape in which the frequency linearly changes on the time axis, and in order to detect LoRa as a packet in the spectral analysis, a process of making the FFT result (spectrum) "rectangular" is necessary. Therefore, in the embodiment, a process of temporarily making the FFT resolutions coarse by adopting the maximum values of a specific frequency range $F_{rec}$ and a specific time range $T_{rec}$ is performed. Hereinafter, the method of determining the values of $F_{rec}$ and $T_{rec}$ will be described.

Figure 16:
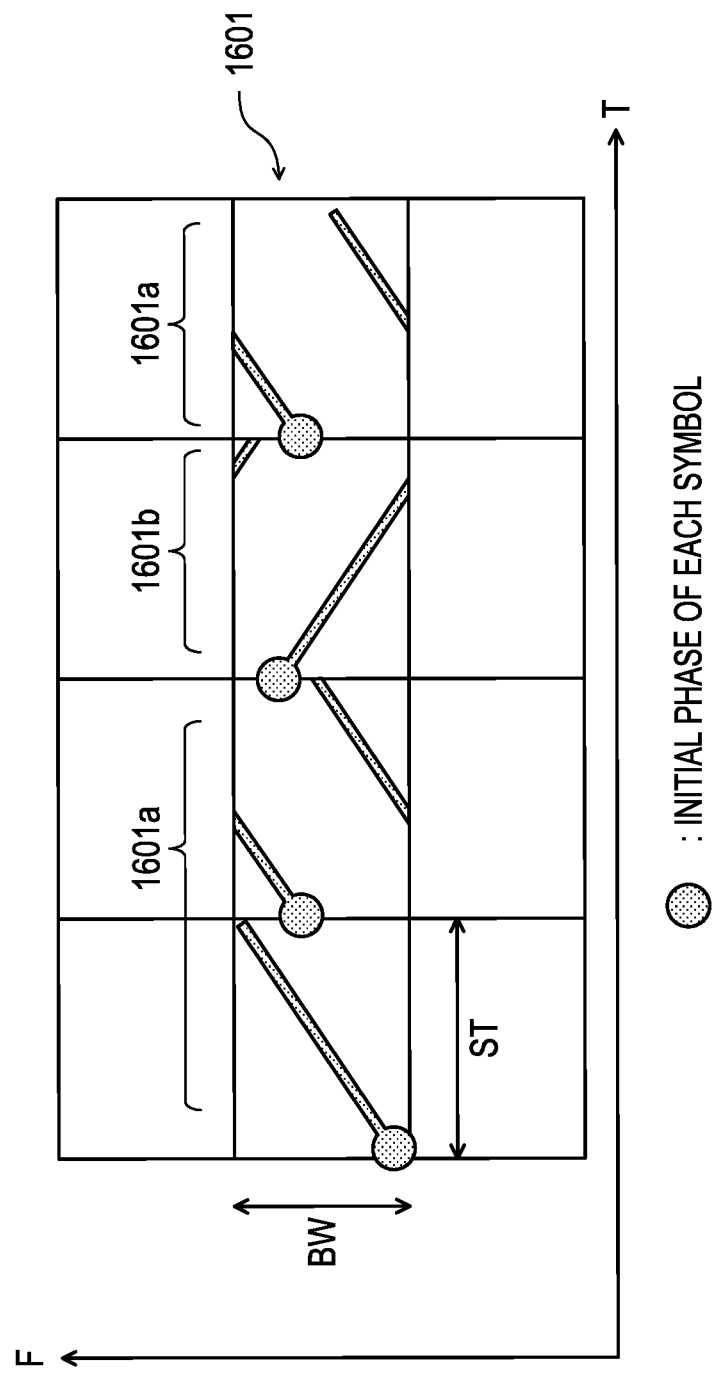
FIG. 16 is a view illustrating an example of a spectrum of a LoRa signal.

FIG. 16 is a view illustrating an example of a spectrum of a LoRa signal. The horizontal axis represents time, and the vertical axis represents a frequency. A LoRa signal 1601 is linearly CSS-modulated in a range of bandwidth BW (BandWidth) and time width ST (Symbol Time), and the initial frequency ("initial phase" indicated by ○ in the figure) in a symbol is reset with the period of ST. The LoRa signal 1601 includes both a UP chirp (chirp whose frequency gradually increases) 1601a and a DOWN chirp (chirp whose frequency gradually decreases) 1601b.

Figure 17:
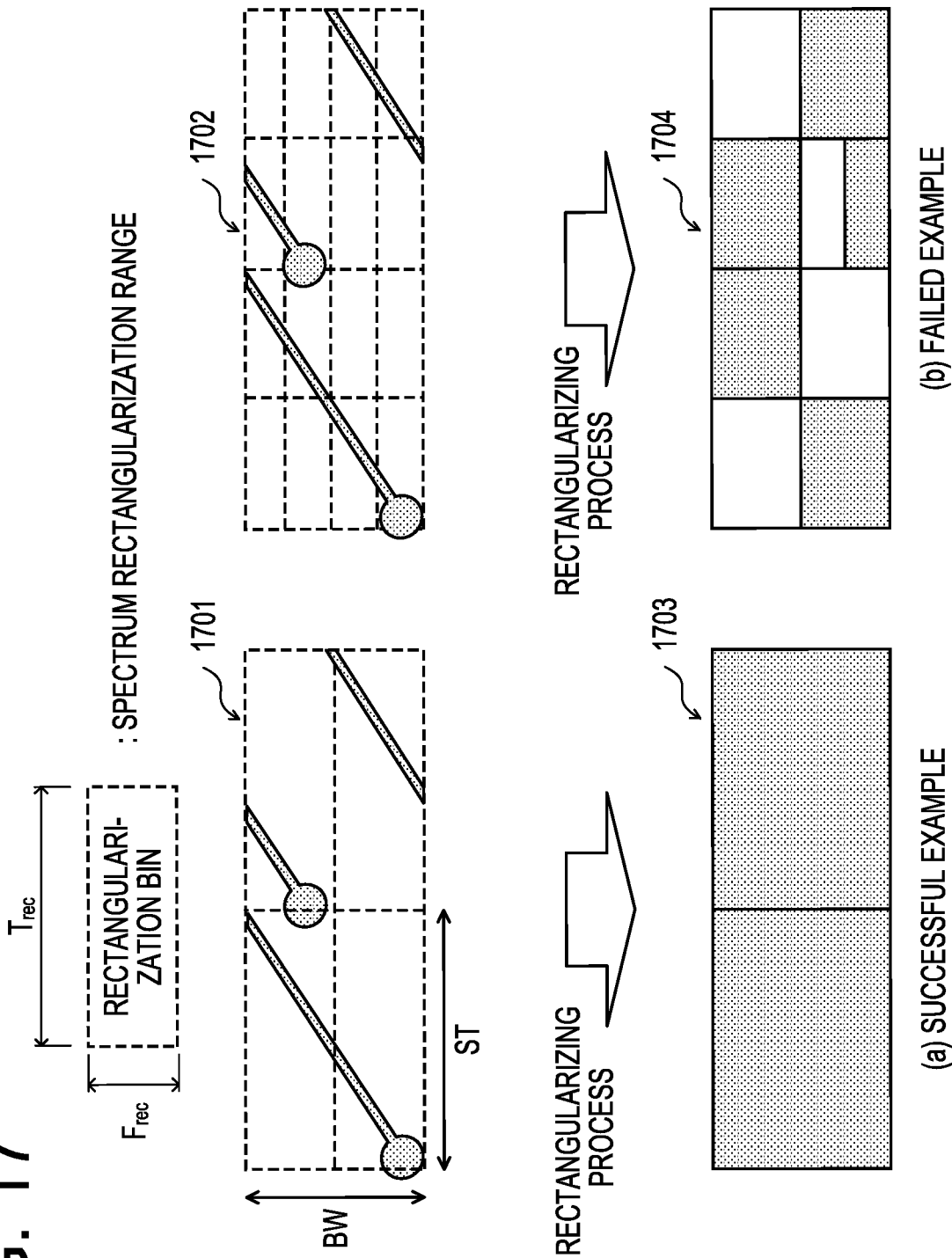
FIG. 17 is an explanatory view of an example where the LoRa signal is successfully made rectangular and an example where the LoRa signal is failed to be made rectangular.

FIG. 17 is an explanatory view of an example where the LoRa signal is successfully made rectangular and an example where the LoRa signal is failed to be made rectangular. Here, each block to be made rectangular is defined as a "rectangularization bin." In FIG. 17, the horizontal axis represents time, and the vertical axis represents a frequency. In FIG. 17, (a) illustrates an example of successful "rectangularization" and (b) illustrates an example of failed "rectangularization." As illustrated in (a) of FIG. 17, when a rectangularization range (rectangularization bin) 1701 is set to have an appropriate size for the chirp state of the LoRa signal 1601, the entire area of the LoRa signal 1601 may be formed into a "rectangle" 1703. Meanwhile, as illustrated in (b) of FIG. 17, when a small rectangularization range (rectangularization bin) 1702 is set for the chirp state of the LoRa signal 1601, some areas (white areas in the figure) where the LoRa signal 1601 exists may not be made rectangular. In this case, a range of plural "rectangles" (rectangularization bins) 1704 in which some portions of the entire area seem like missing teeth is generated.

The frequency range $F_{rec}$ and the time range $T_{rec}$ which are the rectangularization ranges need to have sufficiently large values. Specifically, when the LoRa signal 1601 arrives, it is necessary for all of the rectangularization bins to include the LoRa signal 1601 (the energy of the chirp signal).

Next, descriptions will be made on an example of a setting of "rectangularization" in each of a case (UP-UP) in which the LoRa signal 1601 transitions from an UP chirp to an UP chirp and a case (UP-DOWN) in which the LoRa SIGNAL 1601 transitions from an UP chirp to a DOWN chirp. In addition, it is assumed that a difference in initial phase between a specific symbol and the next symbol is aBW ($0 \leq a \leq$).

Figure 18:
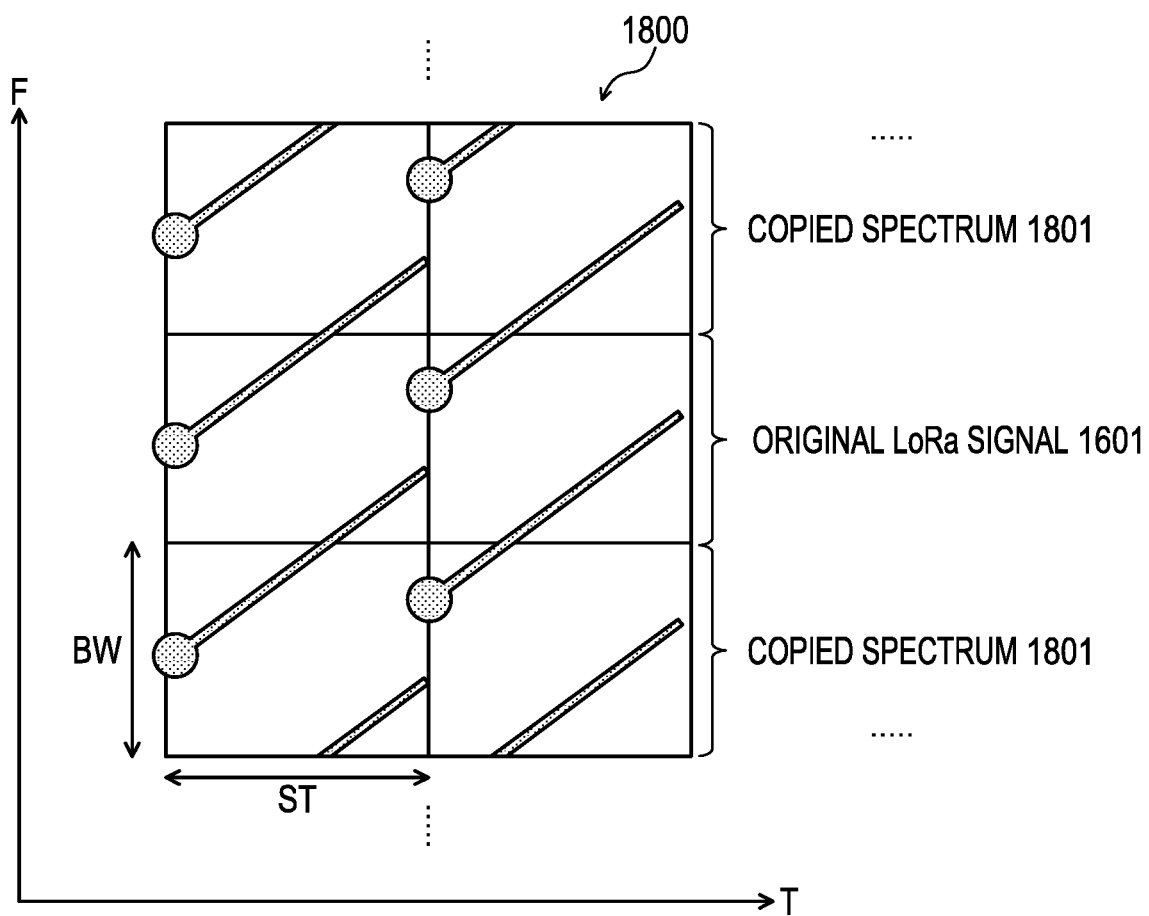
FIG. 18 is a view illustrating an extended spectrum obtained by extending the spectrum of the LoRa signal in a frequency direction.

FIG. 18 is a view illustrating an extended spectrum obtained by extending the spectrum of the LoRa signal in the frequency direction. Hereinafter, the spectrum of the LoRa signal 1601 will be described using an extended spectrum 1800 extended in the frequency direction, as illustrated in FIG. 18. This extended spectrum 1800 is an array in which plural (infinite) copies 1801 of the spectrum of the original LoRa signal 1601 are arranged with the period of BW in the frequency direction.

By using this extended spectrum 1800, setting with the boundary value conditions disregarded becomes possible. When the energy of the LoRa signal 1601 is included in the rectangularization bin existing at any position on the extended spectrum 1800, the set parameters may also be applied to the detection of the actual LoRa signal 1601. Since the boundary value conditions are disregarded, the rectangularization bin becomes a distorted rectangle, rather than a perfect rectangle. However, this kind of distortion is correctable in the spectral analysis.

Figure 19:
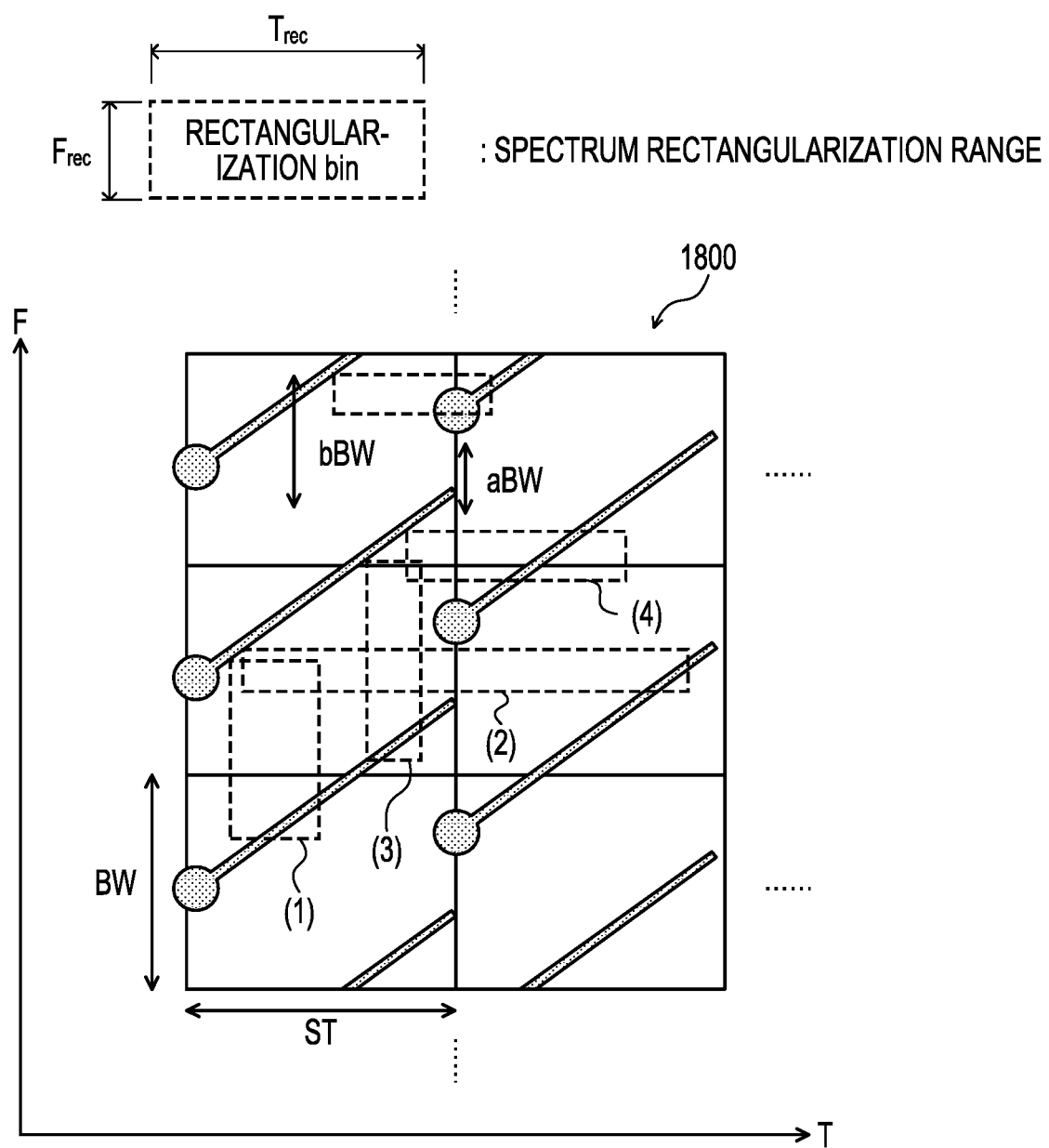
FIG. 19 is a view of an UP-UP case of the LoRa signal.

FIG. 19 is a view of the UP-UP case of the LoRa signal. A case where a point which is the smallest in the time direction in the rectangularization bin and is the largest in the frequency direction (the upper left portion of the rectangularization bin) coincides with the line of the chirp will be described as the worst case of the position of the rectangularized bin. In this case, the energy of the LoRa signal 1601 passing through the upper left portion of the rectangularized bin is not included in the rectangularized bin.

At this time, it is assumed that a frequency difference between the coinciding point and the initial phase is bBW ($0 \leq b \leq 1$). A range of values of $F_{rec}$ and $T_{rec}$ for making at least one point within the range of the rectangularization bin include the LoRa signal 1601 may be classified into four cases (1) to (4) of FIG. 19 from the relationship between a, b, $F_{rec}$, and $T_{rec}$, and may be formulated as the following equation 1.

$$\begin{cases} (1) \quad F_{rec} + \frac{BW}{ST}T_{rec} \geq BW \\ \quad\quad (\text{if } b \leq a \text{ and } bBW \leq F_{rec}) \\ (2) \quad F_{rec} + \frac{BW}{ST}T_{rec} \geq (2-a)BW \\ \quad\quad (\text{if } b \leq a \text{ and } bBW > F_{rec}) \\ (3) \quad F_{rec} + \frac{BW}{ST}T_{rec} \geq BW \\ \quad\quad (\text{if } b > a \text{ and } (1-b)ST > T_{rec}) \\ (4) \quad F_{rec} + \frac{BW}{ST}T_{rec} \geq (1-a)BW \\ \quad\quad (\text{if } b > a \text{ and } (1-b)ST \leq T_{rec}) \end{cases} \quad (1)$$

From the above, the condition that the equation 1 holds for any of a and b ($0 \leq a \leq 1$, $0 \leq b \leq 1$) is represented by the following equation 2.

$$F_{rec} + \frac{BW}{2ST}T_{rec} \geq BW \quad (2)$$

Figure 20:
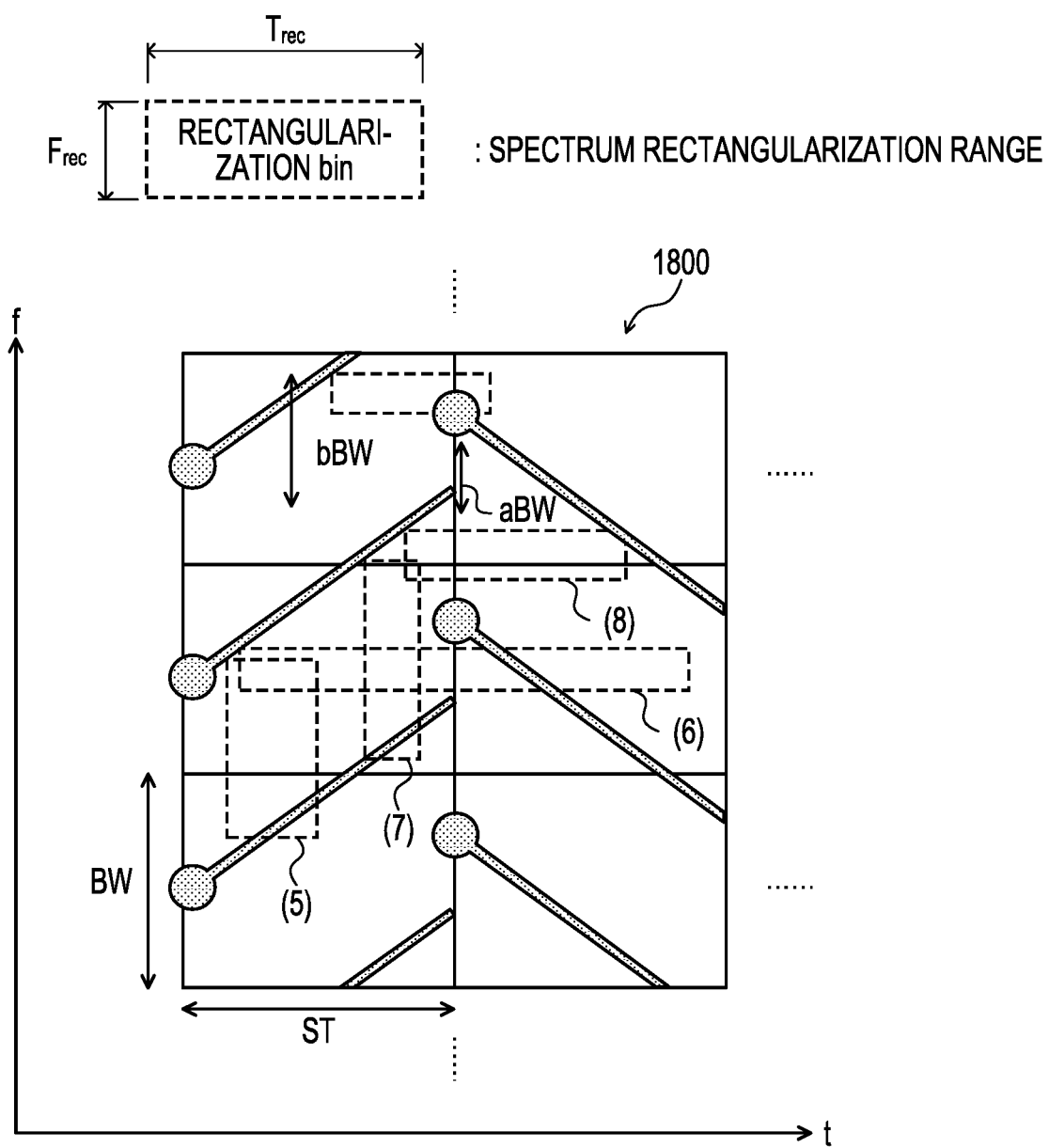
FIG. 20 is a view of an UP-DOWN case of the LoRa signal.

FIG. 20 is a view of the UP-DOWN case of the LoRa signal. As in the UP-UP case, in the worst case where the upper left portion of the rectangularization bin coincides with the chirp line, it is assumed that a frequency difference between the coinciding point and the initial phase is bBW ($0 \leq b \leq 1$). A range of values of $F_{rec}$ and $T_{rec}$ for making at least one point within the range of the rectangularization bin include the LoRa signal may be classified into four cases (5) to (8) of FIG. 20 from the relationship between a, b, $F_{rec}$ and $T_{rec}$, and may be formulated as the following equation 3.

$$\begin{cases} (5) \quad F_{rec} + \frac{BW}{ST}T_{rec} \geq BW \\ \quad\quad (\text{if } b \leq a \text{ and } bBW \leq F_{rec}) \\ (6) \quad T_{rec} \geq (1+a-2b)ST \\ \quad\quad (\text{if } b \leq a \text{ and } bBW > F_{rec}) \\ (7) \quad F_{rec} + \frac{BW}{ST}T_{rec} \geq BW \\ \quad\quad (\text{if } b > a \text{ and } (b-a)BW > F_{rec}) \\ (8) \quad T_{rec} \geq (2+a-2b)ST \\ \quad\quad (\text{if } b > a \text{ and } (b-a)BW \leq F_{rec}) \end{cases} \quad (3)$$

From the above, the condition that the equation 3 holds for any of a and b ($0 \leq a \leq 1$, $0 \leq b \leq 1$) is represented by the following equation 4.

$$F_{rec} + \frac{BW}{2ST}T_{rec} \geq BW \quad (4)$$

A range of values of $F_{rec}$ and $T_{rec}$ that may cope with both the UP-UP case and the UP-DOWN case needs to satisfy both the equation 2 and the equation 4. Since the equation 2 and the equation 4 are equivalent to each other, the values of $F_{rec}$ and $T_{rec}$ may be set to satisfy the following equation 5.

$$F_{rec} + \frac{BW}{2ST}T_{rec} \geqq BW \qquad (5)$$

Figure 21:
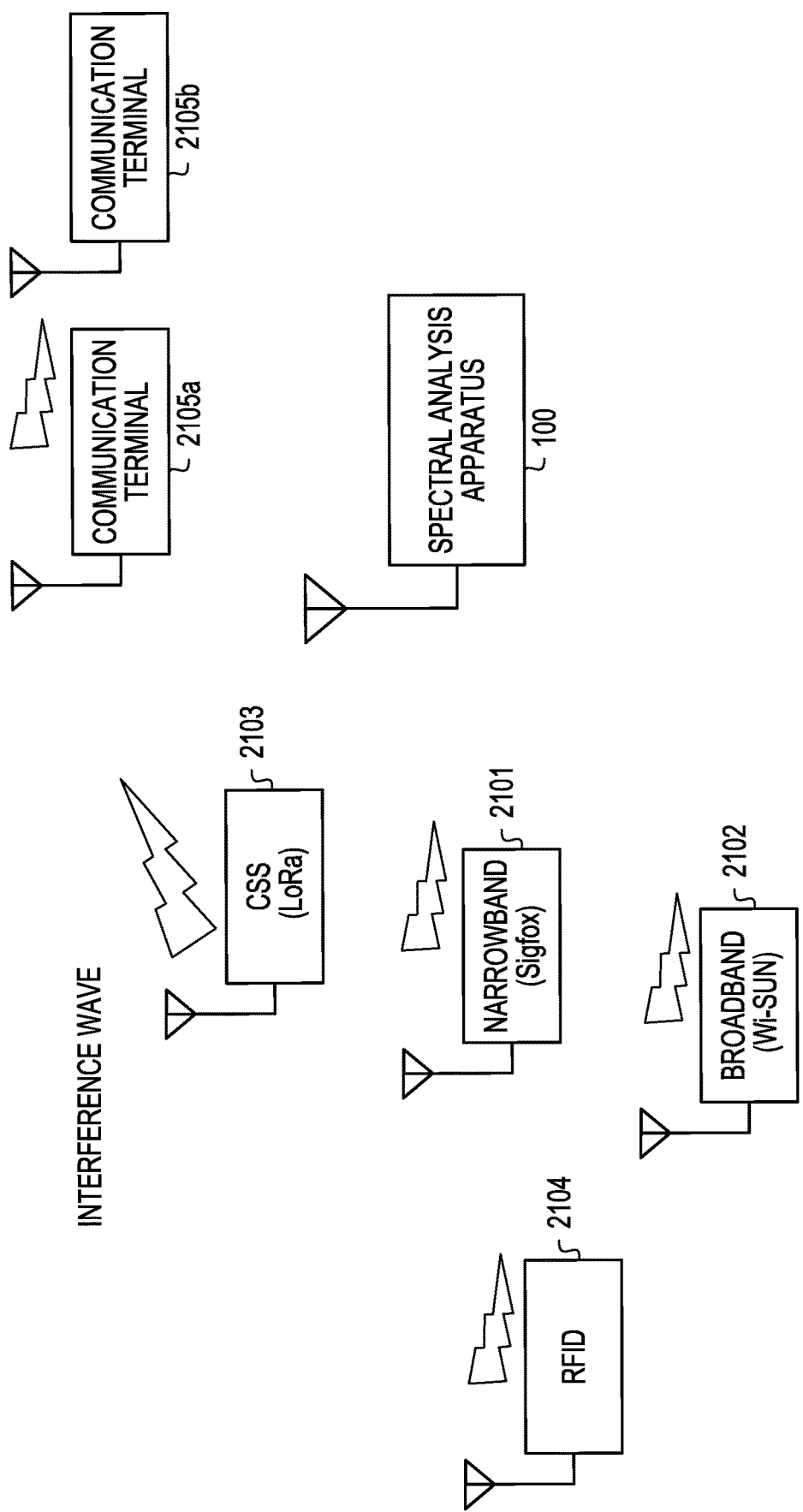
FIG. 21 is a view illustrating an example of a measure against an interference of a radio signal by the spectral analysis apparatus according to the embodiment.

FIG. 21 is a view illustrating an example of a measure against an interference of a radio signal by the spectral analysis apparatus according to the embodiment. The radio signal visualization apparatus according to the embodiment, that is, the spectral analysis apparatus 100, is installed under the wireless environments of communication terminals 2105 (2105a and 2105b) that perform a wireless communication with each other, so that interference waves against the wireless communication of the communication terminals 2105a and 2105b may be visualized.

As interference sources against the communication frequencies (e.g., subgiga bands) of the communication terminals 2105a and 2105b, there are, for example, a communication terminal 2101 such as Sigfox that transmits the above-described narrowband signal packet and a communication terminal 2102 such as Wi-SUN that transmits the broadband signal packet. Further, there are, for example, a communication terminal 2103 such as LoRa that transmits the CSS signal packet, and a communication terminal 2104 with the same RFID as the communication terminals 2105.

Through the above-described primary process, the spectral analysis apparatus 100 may display the spectra of signals of the various radio standards which are the interference sources, in a "rectangular" form. In addition, after the primary process, through the above-described secondary process, the visualization apparatus (the spectral analysis apparatus 100) visualizes and displays the interference waves that interfere with the communication terminals 2105. Here, according to the embodiment, without being limited to the narrowband signal packet or the broadband signal packet, the CSS signal may also be visualized and displayed as the radio signal. Thus, according to the spectral analysis apparatus 100 of the embodiment, for example, it is possible to determine the presence or absence of the interference from the communication terminal 2103 of the CSS signal to the communication terminals 2105, and to take interference measures such as lowering the transmission output of LoRa at the time of the interference.

According to the above-described embodiment, it is possible to determine radio signals of respective standards, including a CSS signal, even in a wireless environment where the radio signals of the respective standards co-exist. At this time, with respect to the CSS, it is possible to detect the feature of the CSS signal while suppressing the deterioration of the power detection sensitivity.

At this time, by performing the FFT with a predetermined frequency resolution and time resolution capable of detecting the CSS signal out of the radio signals, it is possible to detect the features of the radio signals including the CSS signal. More specifically, the CSS signal is chirped with a predetermined frequency change rate within a predetermined bandwidth and symbol time width. In each of a case where the frequency resolution of the CSS signal is made coarse and in a case where the time resolution is made coarse, a frequency resolution and a time resolution are set within the area S which is coarser than a feature line connecting the bandwidth on the frequency axis and the doubled symbol time width on the time axis.

After the FFT, an effective value in a specific frequency domain is adopted to make the frequency resolution of a spectrum coarse, so that the duration of the radio signal including the CSS signal may be calculated. Thereafter, an effective value within the duration is adopted to make the time resolution of the spectrum coarse, so that the bandwidth of the radio signal may be calculated. Then, based on the duration and the bandwidth, the feature of the radio signal of each standard may be determined. The present disclosure is not limited thereto. After the FFT, an effective value in a specific time domain may be adopted to make the time resolution of a spectrum coarse, so that the bandwidth of the radio signal may be calculated, and then, an effective value within the bandwidth may be adopted to make the frequency resolution of the spectrum coarse, so that the duration of the radio signal may be calculated.

In addition, as compared with the method of the related art in which an FFT is merely performed by a parameter adjustment of the frequency resolution or time resolution, the embodiment has the operational effect of measuring the bandwidth/duration with the high resolution while suppressing the deterioration of the power detection sensitivity even in a radio signal including a CSS signal. Further, as compared with the method of the related art in which, for example, the bandwidth/duration are acquired according to a demodulation standard, the embodiment has the operational effect of significantly reducing the processing time.

In addition, in the embodiment, a substantially rectangular pulse area having a duration and a bandwidth on a spectrum to be visualized is detected as the feature of a radio signal including a CSS signal. Further, in the embodiment, the duration is calculated from the length of the time axis of the substantially rectangular pulse area when the frequency resolution is made coarse, and the bandwidth is calculated from the length of the frequency axis of the substantially rectangular pulse area when the time resolution is made coarse. In this way, in the embodiment, the CSS signal may be visualized in a substantially rectangular shape having the duration and bandwidth on the spectrum, so that a sweep-shaped CSS signal may be easily viewed.

In addition, in a case of a band where a channel of a radio signal is predefined, a range in which the frequency resolution is made coarse corresponds to the channel width or an integer fraction of the channel width. As a result, even when radio signals of different standards including a CSS signal are congested in the frequency direction, the radio signals of the respective standards may be distinguishably determined.

Further, by adopting a maximum value as the effective value when a resolution is made coarse, detected spectrum power is not embedded in a noise so that the deterioration of the reception sensitivity may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a procedure to determine a feature of each standard of a wireless environment in which radio signals including a Chirp Spread Spectrum (CSS) signal chirp-modulated co-exist, the procedure comprising:
    obtaining a spectrum by subjecting each radio signal to fast Fourier transform with predetermined frequency resolution and time resolution capable of visualizing a feature of the CSS signal;
    coarsening the frequency resolution of the spectrum by adopting an effective value in a specific frequency domain;
    calculating a duration of the radio signal, based on the coarsened frequency resolution of the spectrum;
    coarsening the time resolution of the spectrum by adopting an effective value in the duration;
    calculating a bandwidth of the radio signal, based on the coarsened time resolution of the spectrum; and
    determining the feature of the radio signal of each standard, based on the duration and the bandwidth.

2. The non-transitory computer-readable recording medium according to claim 1, wherein the fast Fourier transform is performed with the predetermined frequency resolution and time resolution capable of detecting the CSS signal.

3. The non-transitory computer-readable recording medium according to claim 1, wherein, when the CSS signal is chirped with a predetermined frequency change rate within a predetermined bandwidth and symbol time width, in each of a case where the frequency resolution is coarsened and a case where the time resolution is coarsened, the frequency resolution and the time resolution are set within an area which is coarser than a feature line coupling the bandwidth on a frequency axis and double the symbol time width on a time axis.

4. The non-transitory computer-readable recording medium according to claim 1,
    wherein the feature is that a shape of a spectrum to be visualized is a substantially rectangular pulse area having the duration and the bandwidth, and
    wherein the procedure:
    calculates the duration, based on a length of a time axis of the substantially rectangular pulse area when the frequency resolution is coarsened, and
    calculates the bandwidth, based on a length of a frequency axis of the substantially rectangular pulse area when the time resolution is coarsened.

5. The non-transitory computer-readable recording medium according to claim 1, wherein, in a case of band where a channel of the radio signal is predetermined, a range in which the frequency resolution is coarsened corresponds to a width of the channel or an integer fraction of the width of the channel.

6. The non-transitory computer-readable recording medium according to claim 1,
    wherein the procedure:
    coarsens the frequency resolution of the spectrum by adopting the effective value in the bandwidth, and
    calculates the duration of the radio signal, based on the frequency resolution of the spectrum.

7. The non-transitory computer-readable recording medium according to claim 1, wherein the procedure adopts a maximum value of a detected spectral power as the effective value.

8. The non-transitory computer-readable recording medium according to claim 1, the procedure further comprising:
    analyzing a baseband signal of the radio signal by using the determined feature of the radio signal of each standard; and
    determining bandwidth occupation rate of the radio signal of each standard.

9. A spectral analysis method to determine a feature of each standard of a wireless environment in which radio signals including a Chirp Spread Spectrum (CSS) signal chirp-modulated co-exist, the spectral analysis method comprising:
    obtaining a spectrum by subjecting each radio signal to fast Fourier transform with predetermined frequency resolution and time resolution capable of visualizing a feature of the CSS signal;
    coarsening the frequency resolution of the spectrum by adopting an effective value in a specific frequency domain;
    calculating a duration of the radio signal, based on the coarsened frequency resolution of the spectrum;
    coarsening the time resolution of the spectrum by adopting an effective value in the duration;
    calculating a bandwidth of the radio signal, based on the coarsened time resolution of the spectrum; and
    determining the feature of the radio signal of each standard, based on the duration and the bandwidth, by a processor.

10. A spectral analysis apparatus to determine a feature of each standard of a wireless environment in which radio signals including a Chirp Spread Spectrum (CSS) signal chirp-modulated co-exist, the spectral analysis apparatus comprising:
    a memory; and
    a processor coupled to the memory and the processor configured to:
    obtain a spectrum by subjecting each radio signal to fast Fourier transform with predetermined frequency resolution and time resolution capable of visualizing a feature of the CSS signal;
    coarsen the frequency resolution of the spectrum by adopting an effective value in a specific frequency domain;
    calculate a duration of the radio signal, based on the coarsened frequency resolution of the spectrum;
    coarsen the time resolution of the spectrum by adopting an effective value in the duration;
    calculate a bandwidth of the radio signal, based on the coarsened time resolution of the spectrum; and
    determine the feature of the radio signal of each standard, based on the duration and the bandwidth.

* * * * *